United States Patent
Nagata et al.

(10) Patent No.: US 10,607,427 B2
(45) Date of Patent: Mar. 31, 2020

(54) INFORMATION PROCESSING DEVICE, INFORMATION PROCESSING METHOD, AND PROGRAM FOR RECOGNIZING A USER

(71) Applicant: SONY CORPORATION, Tokyo (JP)

(72) Inventors: Masaharu Nagata, Tokyo (JP); Yasuhiro Matsui, Kanagawa (JP); Kiyoshi Yoshikawa, Saitama (JP)

(73) Assignee: SONY CORPORATION, Tokyo (JP)

( * ) Notice: Subject to any disclaimer, the term of this patent is extended or adjusted under 35 U.S.C. 154(b) by 163 days.

(21) Appl. No.: 15/552,389

(22) PCT Filed: Apr. 11, 2016

(86) PCT No.: PCT/JP2016/001976
§ 371 (c)(1),
(2) Date: Aug. 21, 2017

(87) PCT Pub. No.: WO2016/194282
PCT Pub. Date: Dec. 8, 2016

(65) Prior Publication Data
US 2018/0040178 A1    Feb. 8, 2018

(30) Foreign Application Priority Data

Jun. 3, 2015    (JP) .................................. 2015-113048

(51) Int. Cl.
*G06K 9/00*         (2006.01)
*G07C 9/00*         (2020.01)

(52) U.S. Cl.
CPC ..... *G07C 9/00087* (2013.01); *G06K 9/00771* (2013.01); *G07C 9/00158* (2013.01)

(58) Field of Classification Search
CPC ..... G06F 21/32; G06F 21/31; G06K 9/00617; G06K 9/00892; G06K 9/00771; G07C 9/00087; G07C 9/00158
See application file for complete search history.

(56) References Cited

U.S. PATENT DOCUMENTS 9,286,482 B1*   3/2016   Dumont ................. G06F 21/32
2005/0071635 A1*   3/2005   Furuyama ............. G06F 21/32
                                                                  713/168

(Continued)

FOREIGN PATENT DOCUMENTS

GB    2338815 A    12/1999
JP    2004-129071 A   4/2004

(Continued)

OTHER PUBLICATIONS

Jan. 8, 2019, Japanese Office Action issued for related JP Application No. 2015-113048.

(Continued)

*Primary Examiner* — Li Liu
(74) *Attorney, Agent, or Firm* — Paratus Law Group, PLLC

(57) ABSTRACT

An information processing apparatus including circuitry configured to obtain, from sensors, first and second observation information related to at least one characteristic of a user, recognize the user based on correlation between the first and second observation information, and initiate an execution function associated with the recognized user.

21 Claims, 18 Drawing Sheets

(56) References Cited

U.S. PATENT DOCUMENTS

| | | | |
|---|---|---|---|
| 2007/0198850 A1* | 8/2007 | Martin | G07C 9/00087 713/186 |
| 2013/0086674 A1* | 4/2013 | Horvitz | G06F 21/32 726/19 |
| 2013/0152002 A1* | 6/2013 | Menczel | G06F 3/0488 715/765 |
| 2013/0198832 A1* | 8/2013 | Draluk | G06F 21/31 726/16 |
| 2014/0040989 A1* | 2/2014 | Davis | H04L 63/08 726/4 |
| 2014/0200737 A1* | 7/2014 | Lortz | B60R 25/25 701/1 |
| 2014/0359722 A1* | 12/2014 | Schultz | H04L 63/0861 726/5 |
| 2015/0011845 A1 | 1/2015 | Yuen et al. | |
| 2016/0089033 A1* | 3/2016 | Saponas | A61B 5/0205 600/483 |
| 2016/0149904 A1* | 5/2016 | Kim | G06F 21/32 713/186 |
| 2017/0050201 A1* | 2/2017 | Deivasigamani | B05B 12/122 |
| 2018/0232522 A1* | 8/2018 | Shear | H04L 63/0861 |

FOREIGN PATENT DOCUMENTS

| | | |
|---|---|---|
| JP | 2005-107960 A | 4/2005 |
| JP | 2010-015418 A | 1/2010 |
| JP | 2011-517791 A | 6/2011 |
| JP | 2013-074461 A | 4/2013 |
| JP | 2013-097760 A | 5/2013 |
| WO | WO2011/067675 A2 | 6/2011 |
| WO | WO2014/182787 A2 | 11/2014 |

OTHER PUBLICATIONS

Jul. 17, 2019, European Communication issued for related EP Application No. 16721514.4.

* cited by examiner

[Fig. 1]
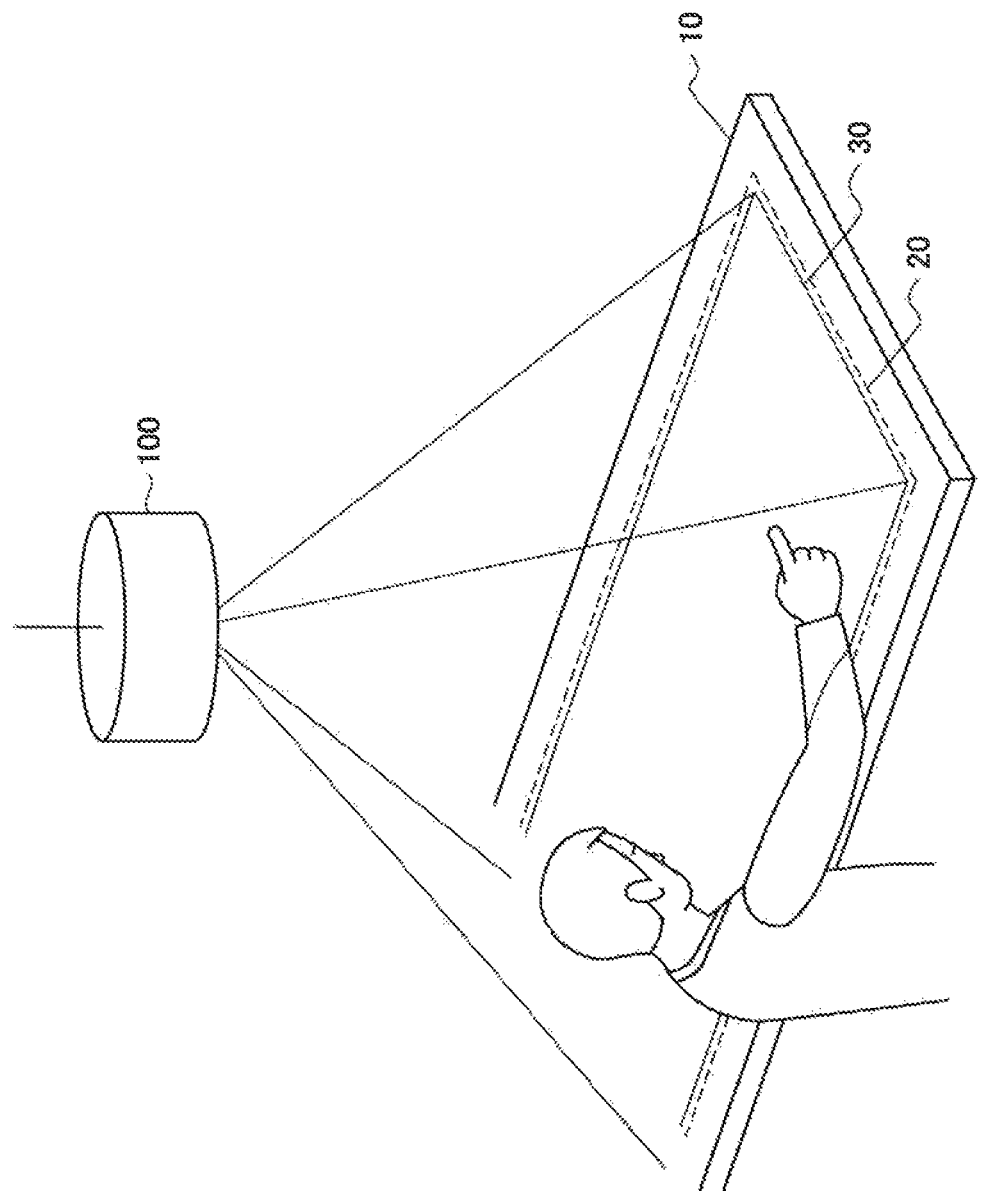

[Fig. 2]
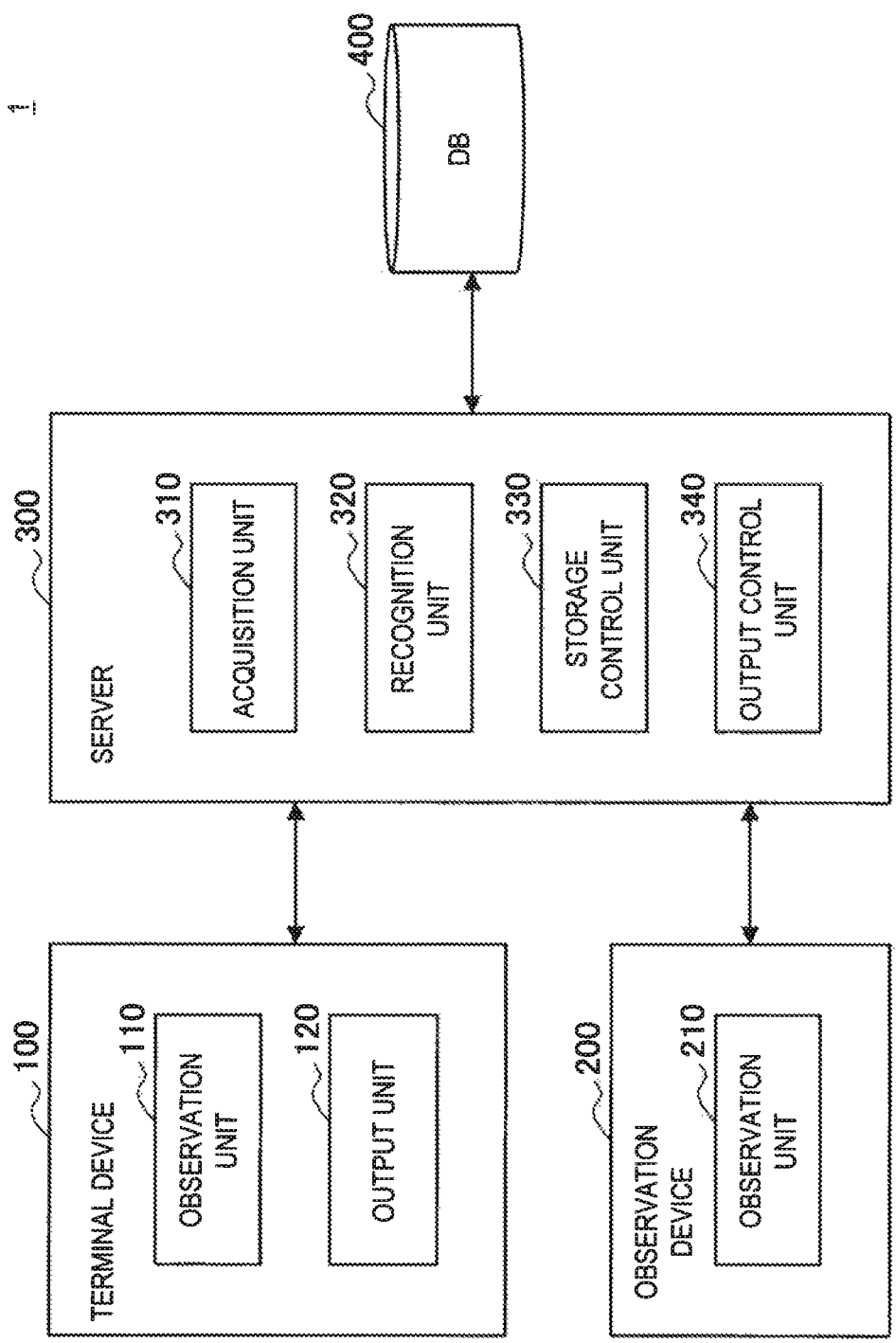

[Fig. 3]
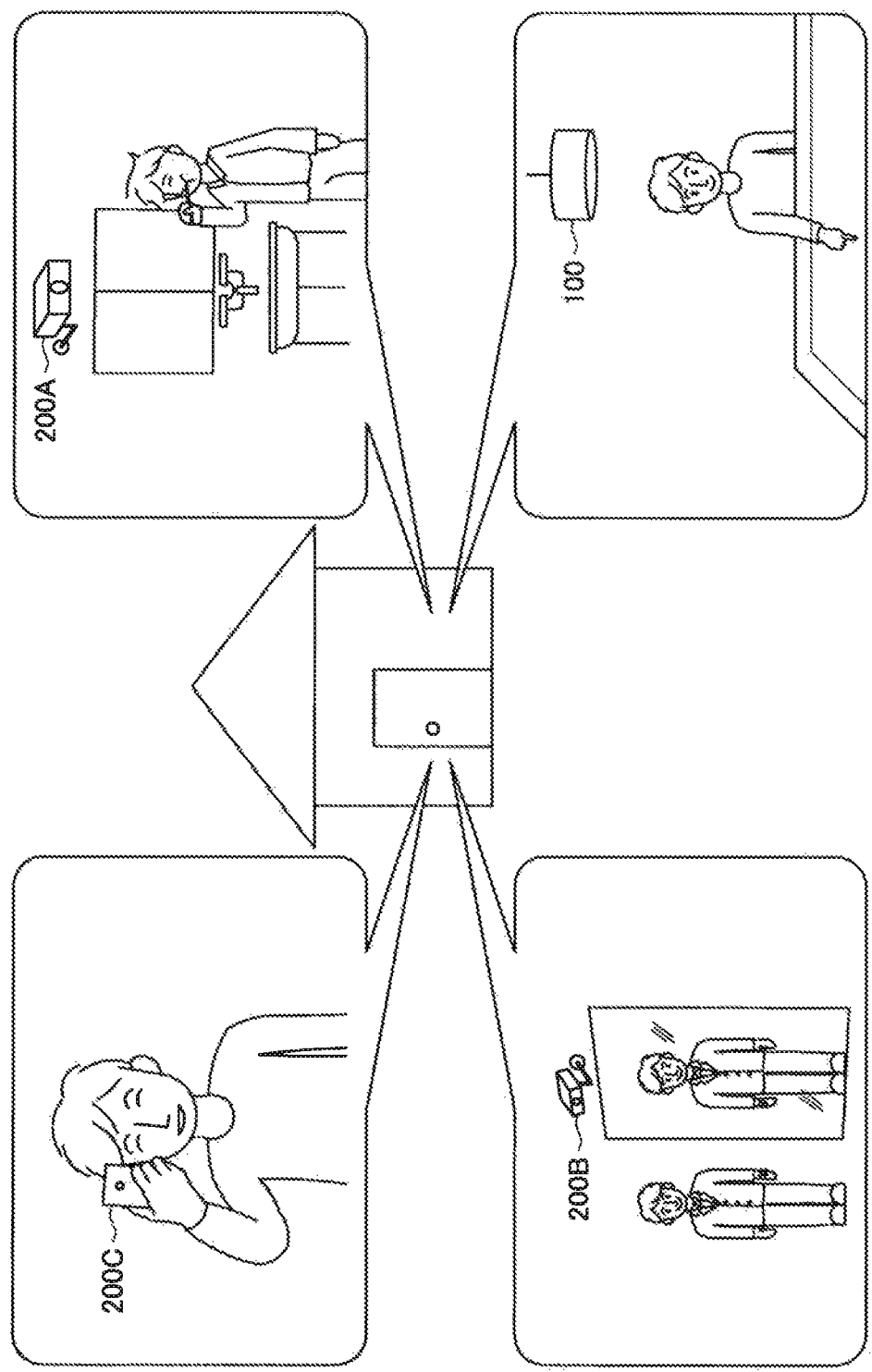

[Fig. 4]
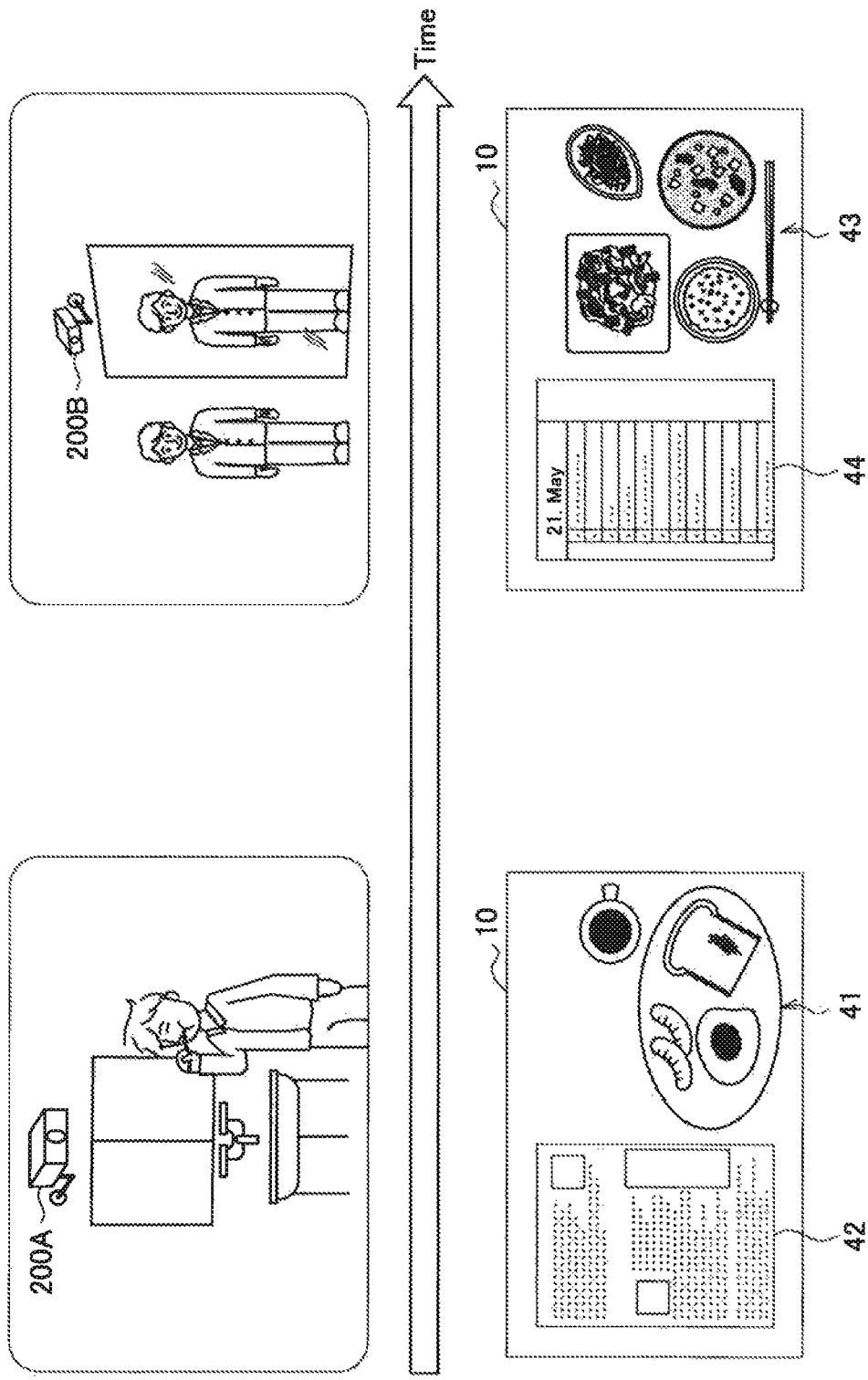

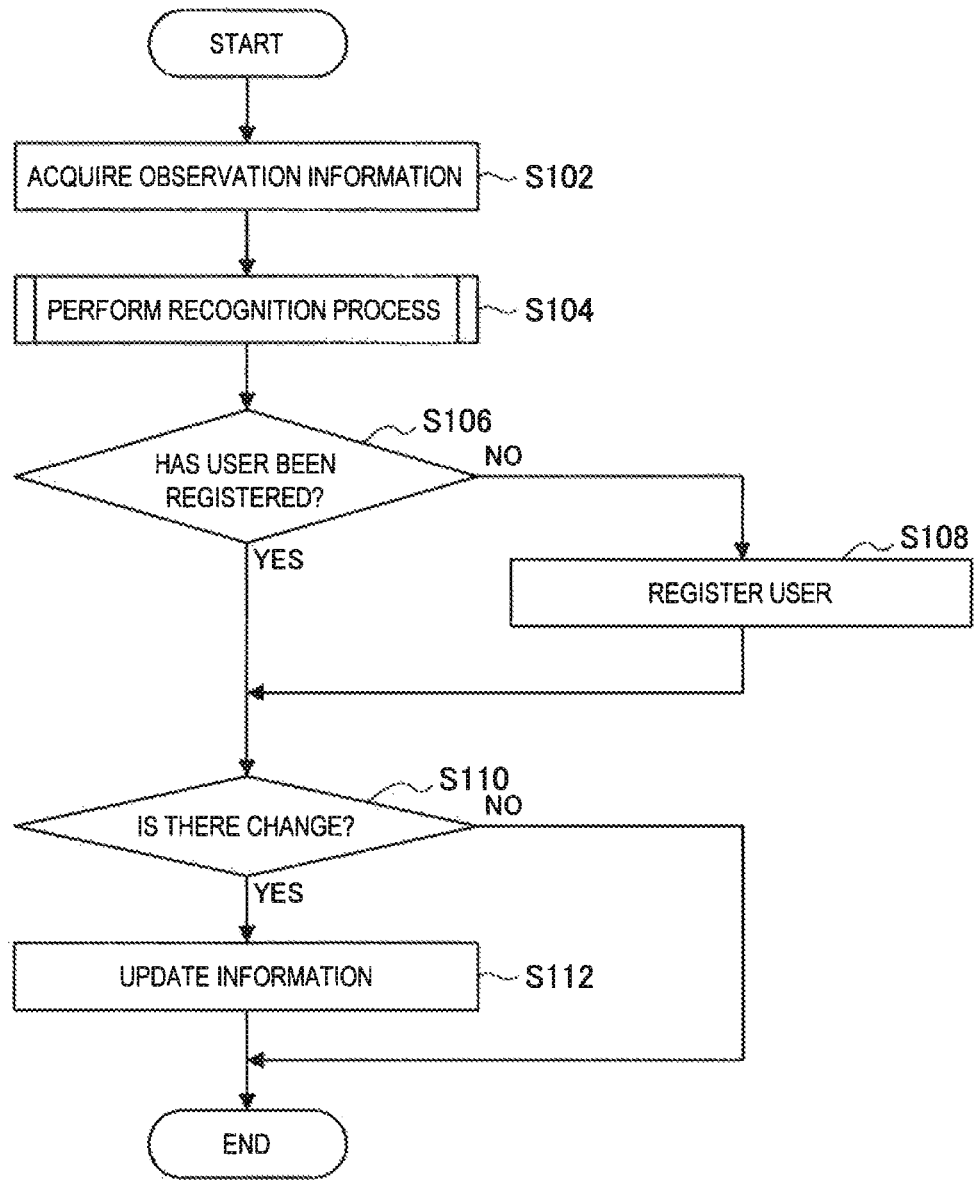
[Fig. 5]

[Fig. 6]
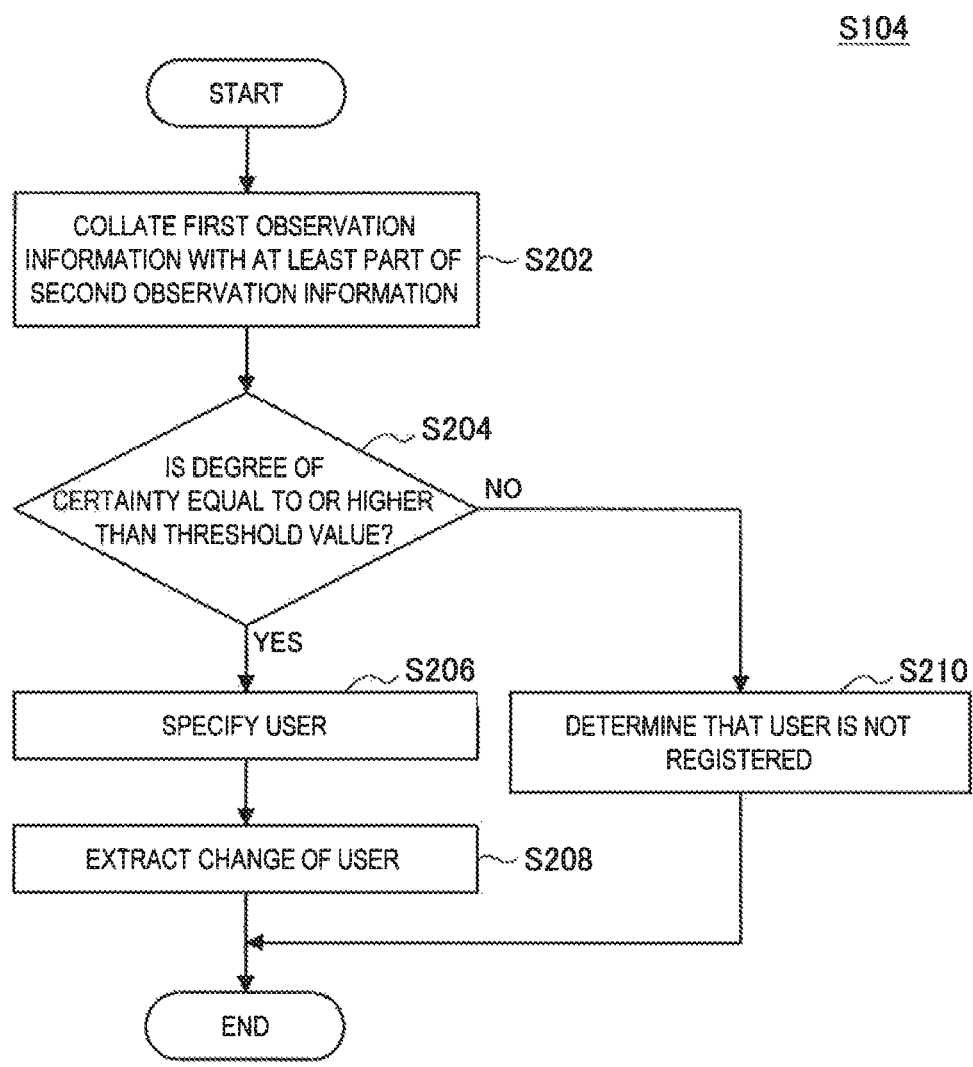

[Fig. 7]
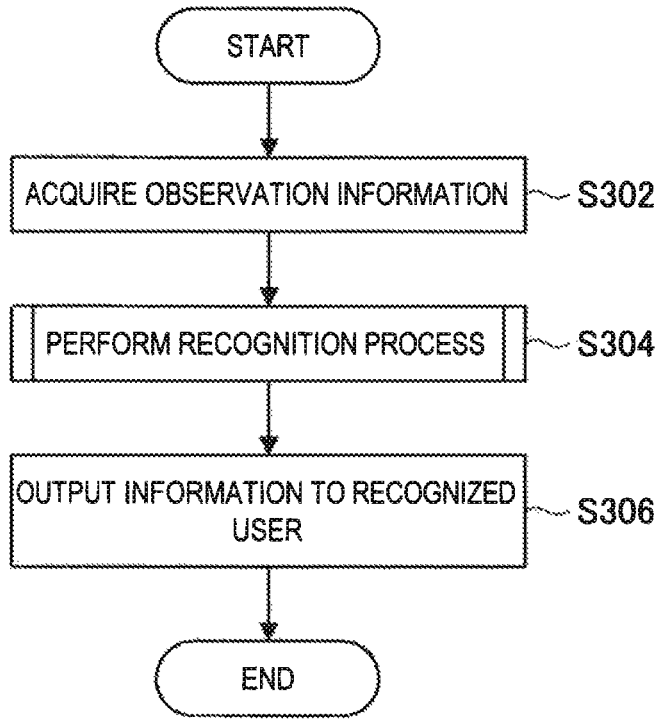

[Fig. 8]
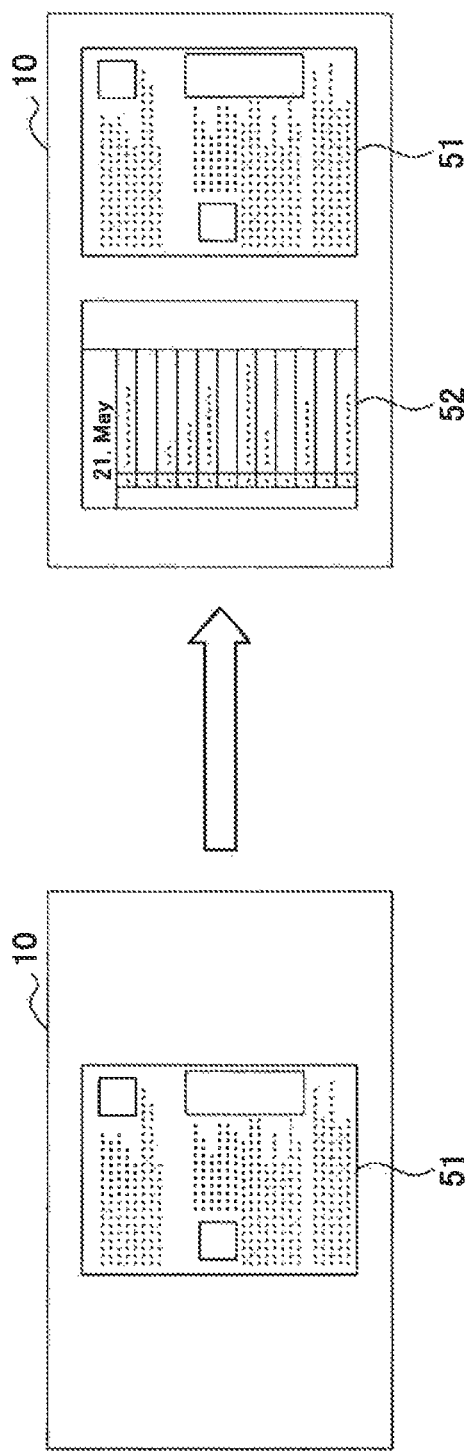

[Fig. 9]
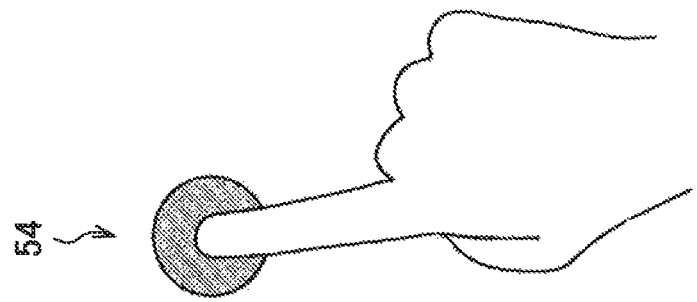
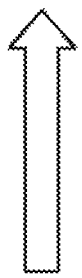
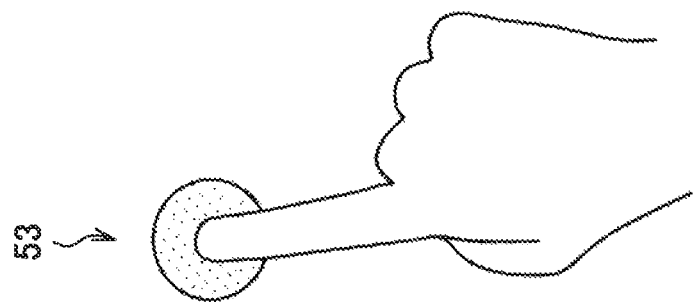

[Fig. 10]
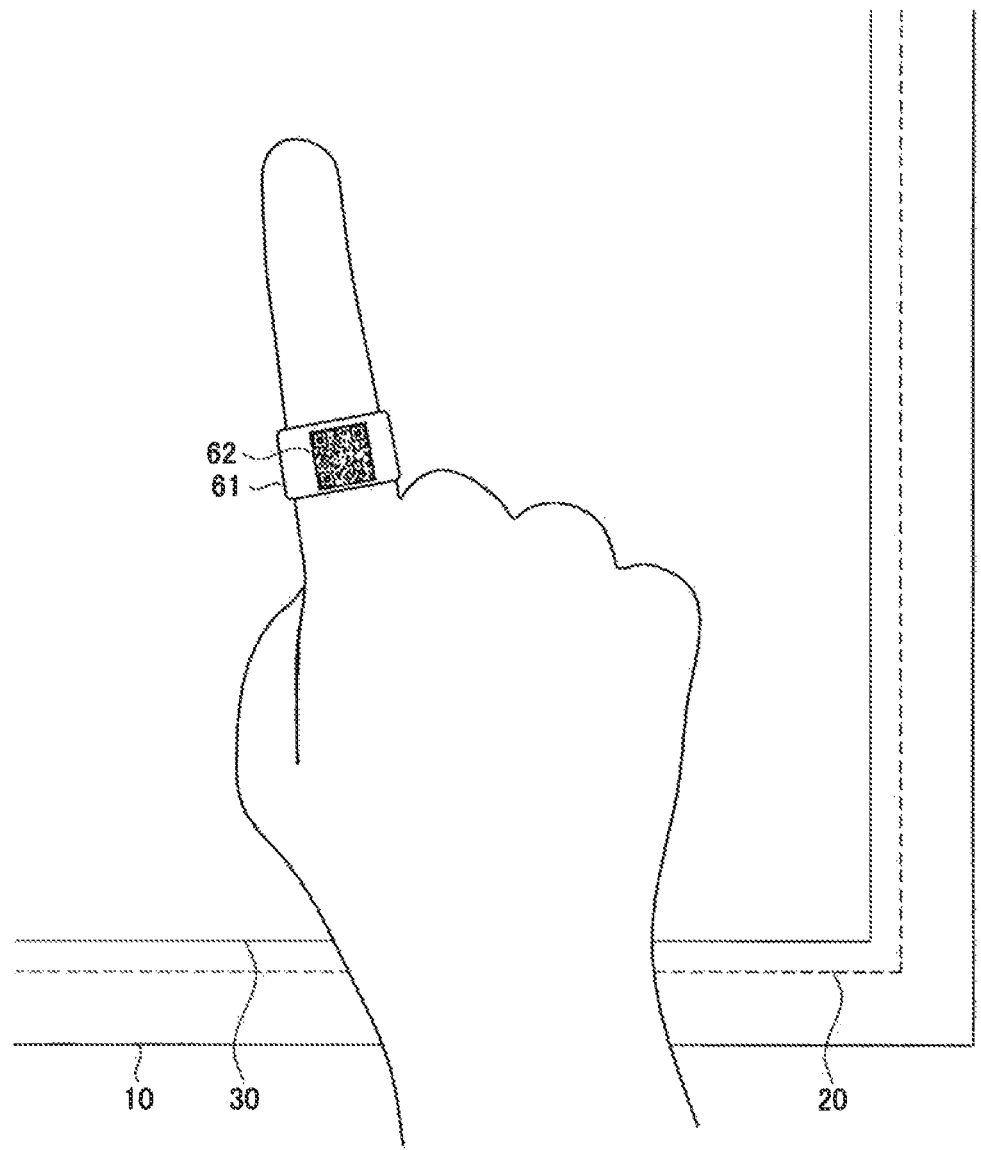

[Fig. 11]
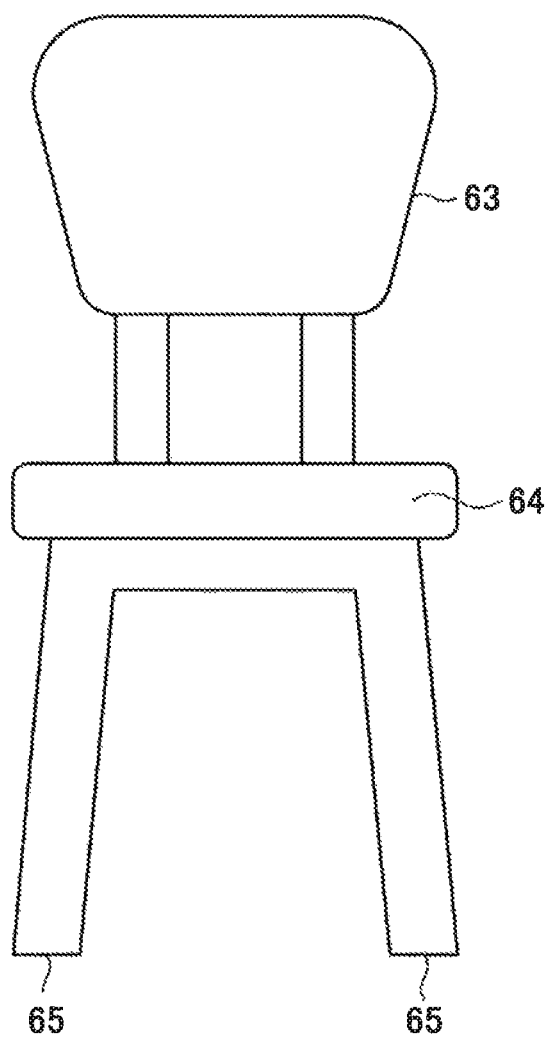

[Fig. 12]
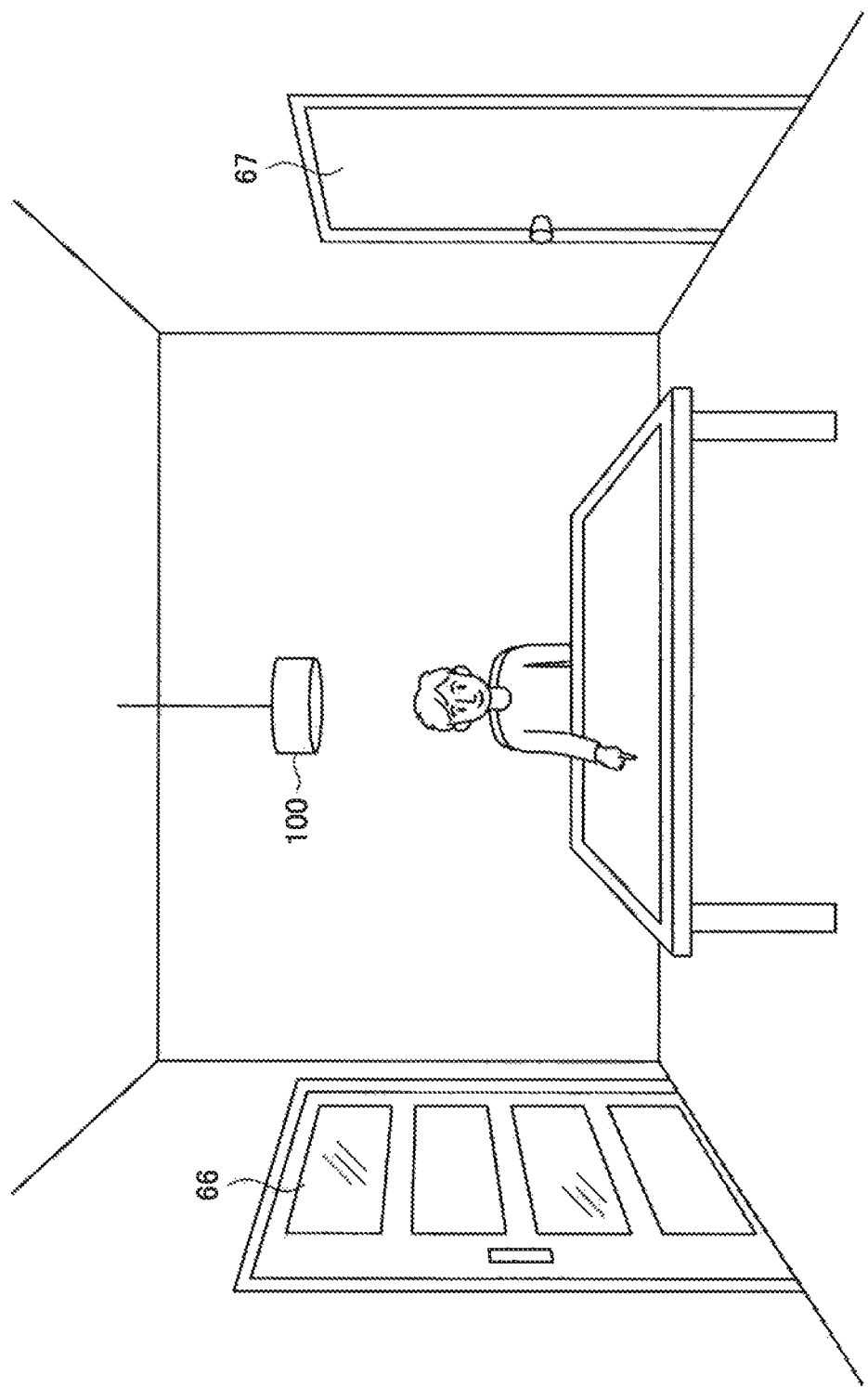

[Fig. 13]
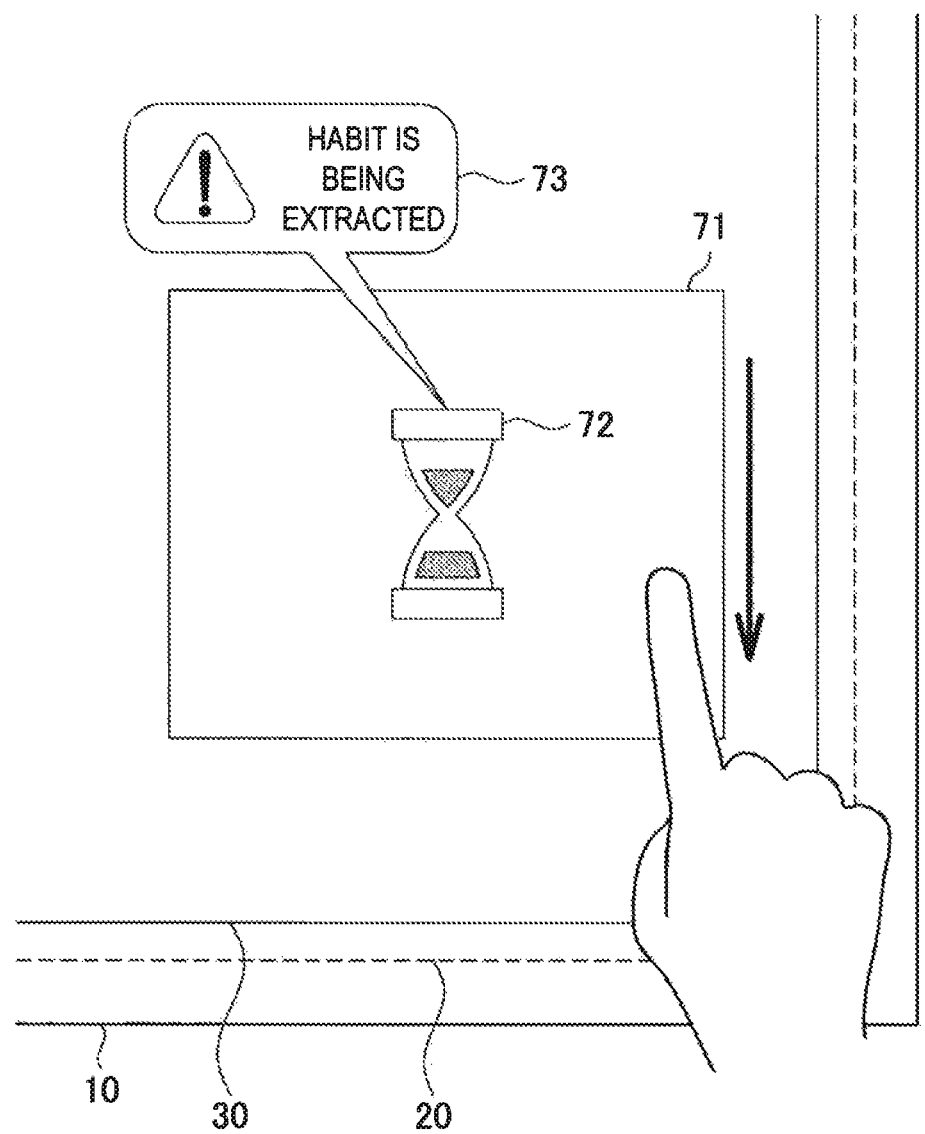

[Fig. 14]
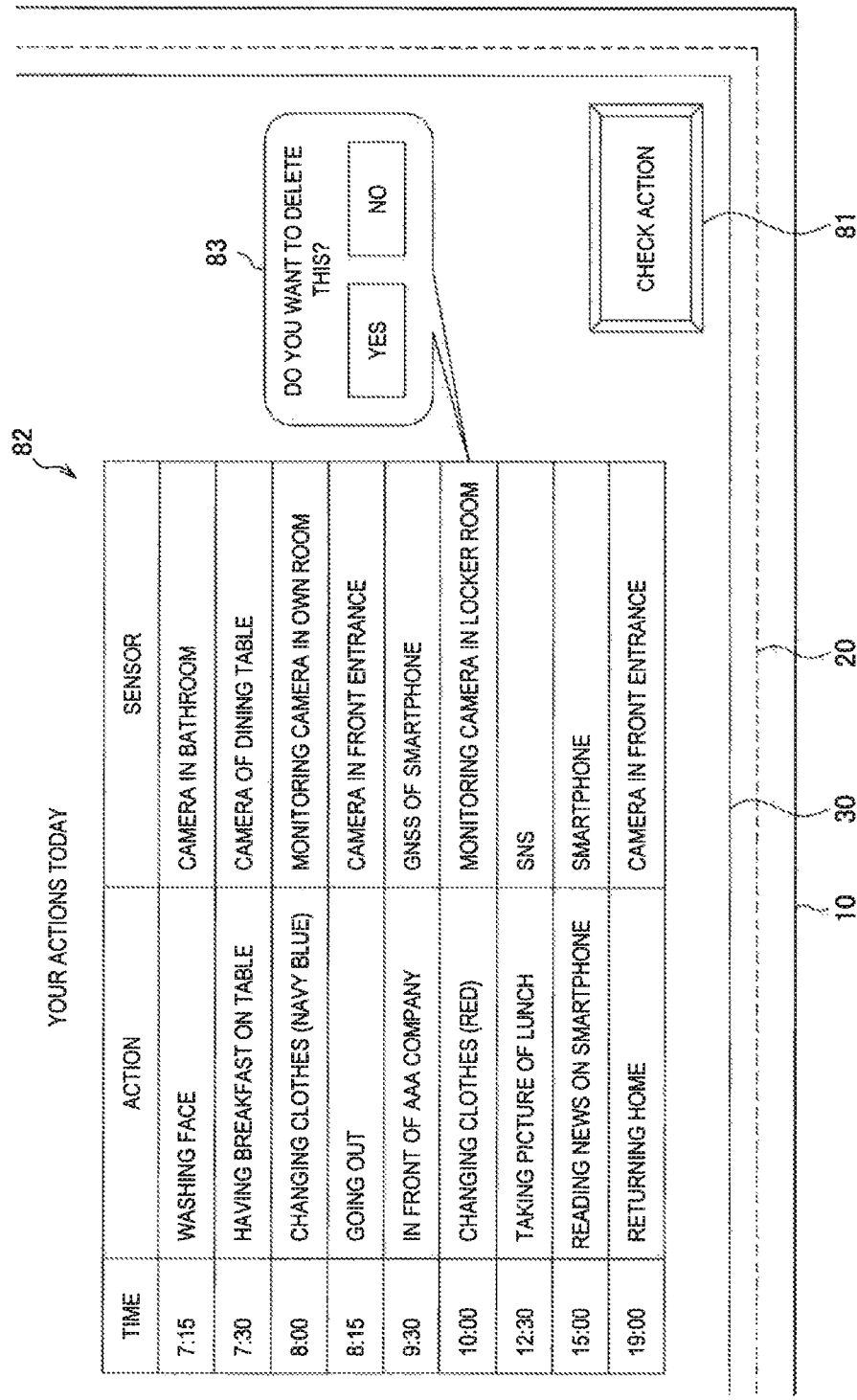

[Fig. 15]
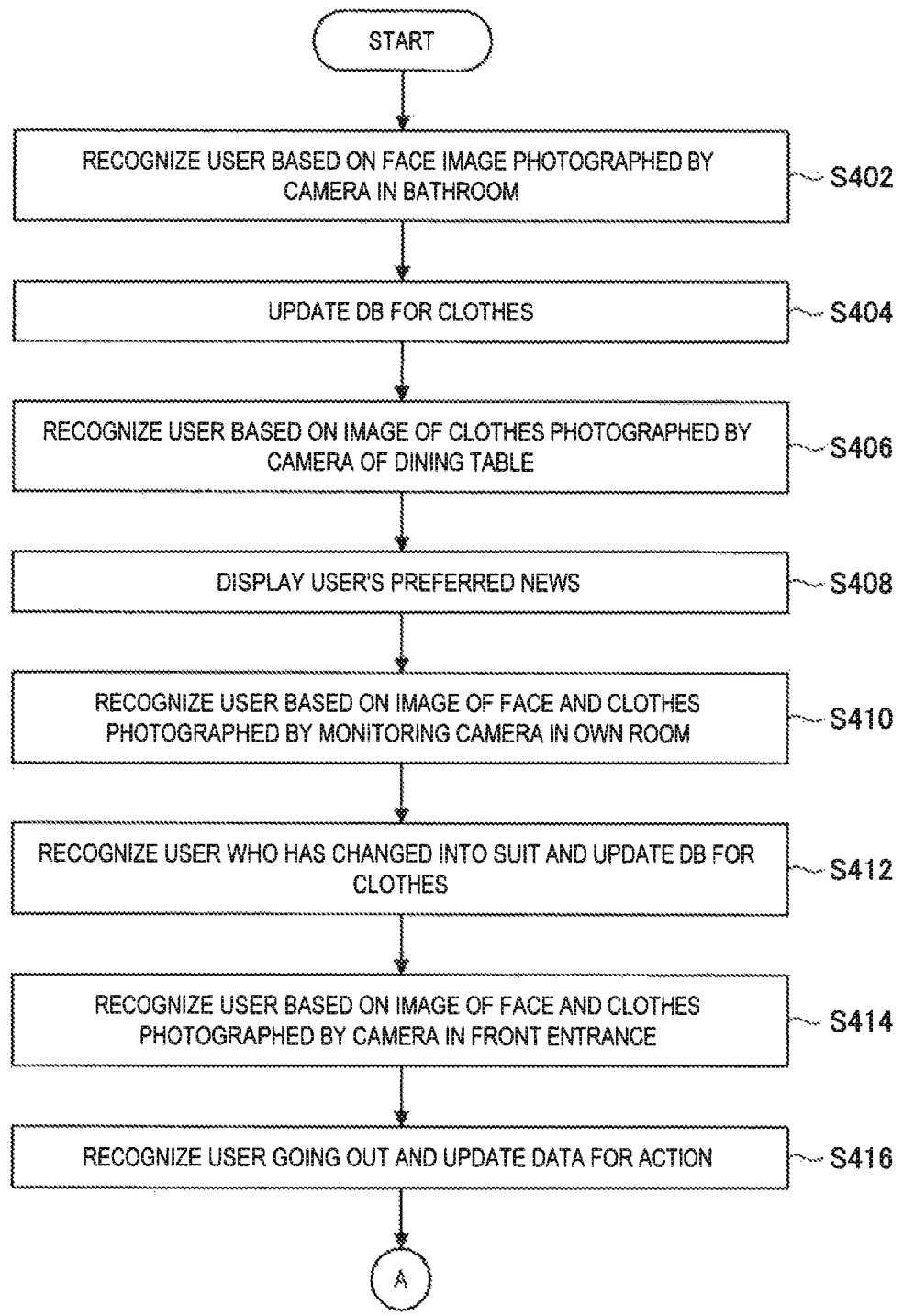

[Fig. 16]
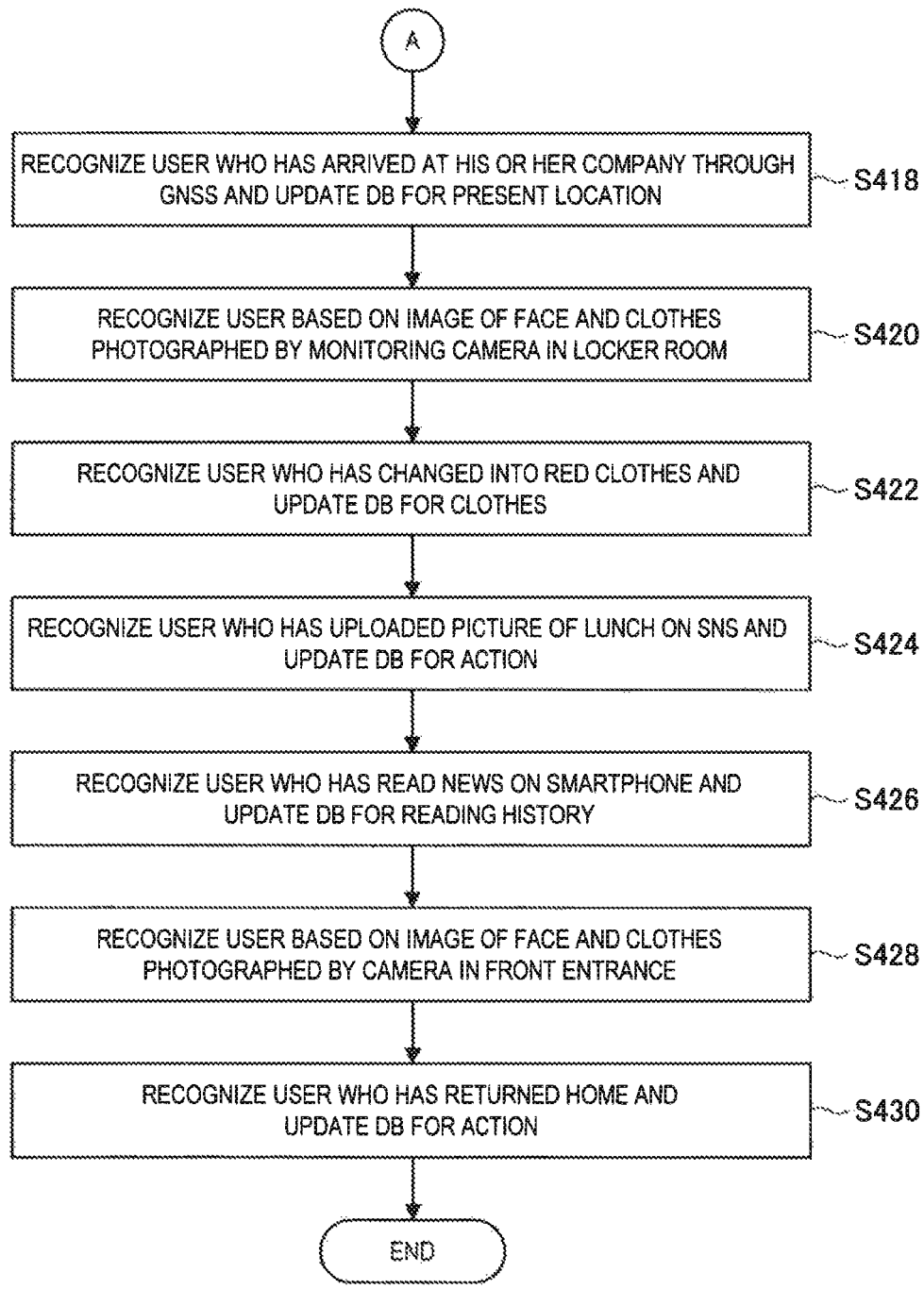

[Fig. 17]
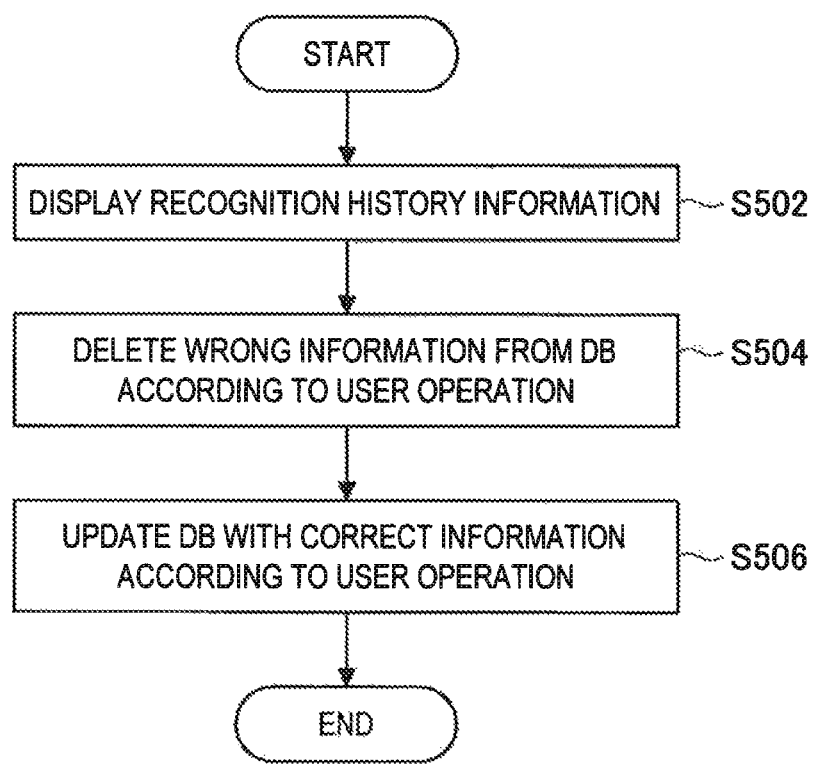

[Fig. 18]
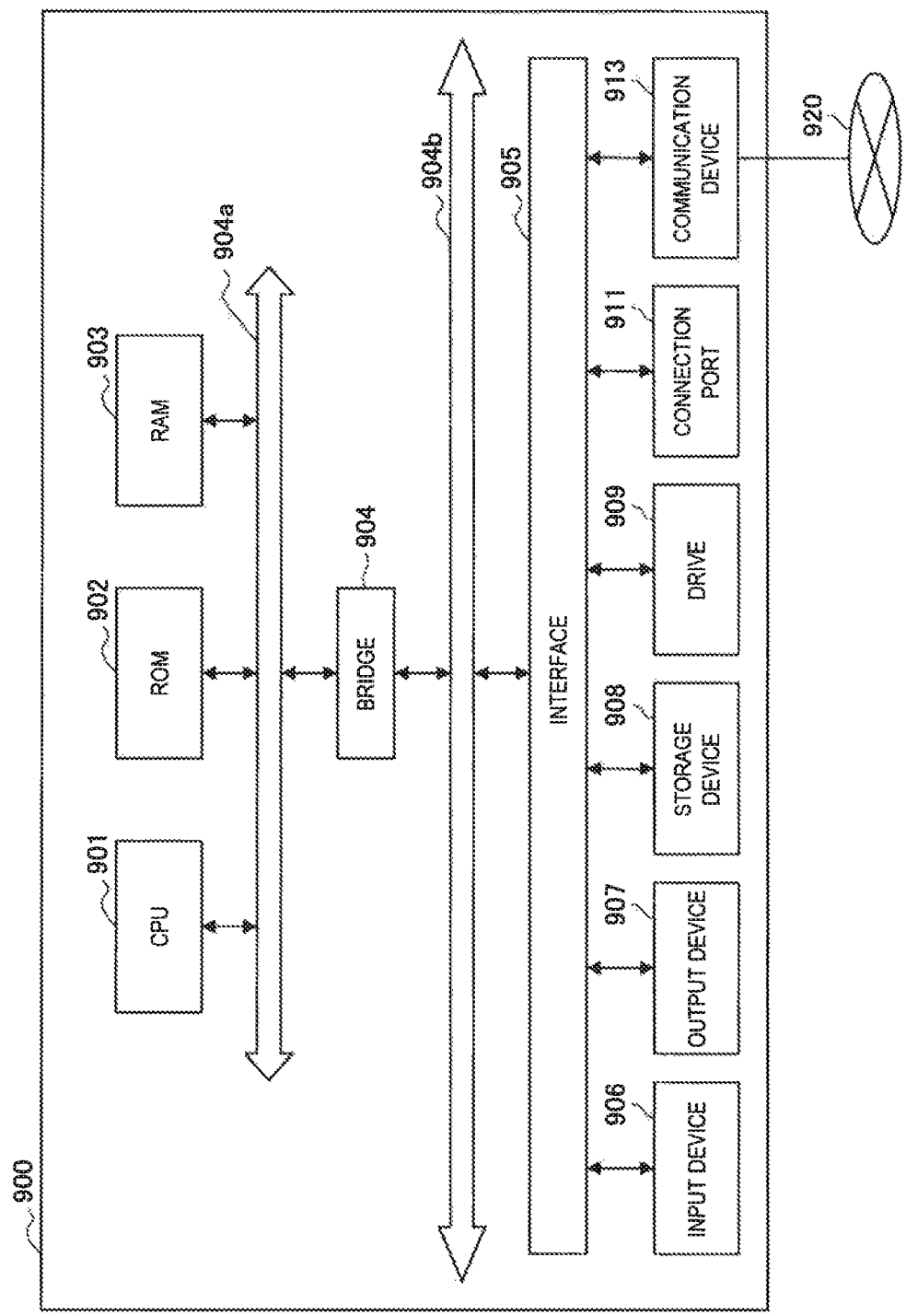

INFORMATION PROCESSING DEVICE, INFORMATION PROCESSING METHOD, AND PROGRAM FOR RECOGNIZING A USER

CROSS REFERENCE TO RELATED APPLICATIONS

This application is a National Stage Patent Application of PCT International Patent Application PCT/JP2016/001976 filed Apr. 11, 2016 under 35 U.S.C. § 371, which claims the benefit of Japanese Priority Patent Application JP 2015-113048 filed Jun. 3, 2015, the entire contents of which are incorporated herein by reference.

TECHNICAL FIELD

The present disclosure relates to information processing device, an information processing method, and a program.

BACKGROUND ART

User recognition technologies typified by a face recognition technology have been widely used in recent years. For example, a technology for services that are highly likely to be used by a plurality of users to recognize the users and provide the services that correspond to the recognized users has been developed.

PTL 1 mentioned below, for example, discloses a technology of recognizing, in a television conference system, conference participants in a remote place and visually displaying attribute information of the conference participants.

CITATION LIST

Patent Literature

[PTL 1]
JP 2004-129071A

SUMMARY

Technical Problem

In services associated with user recognition as disclosed in Patent Literature 1 described above, services to be provided are switched according to success or failure of user recognition. There is, however, inconvenience that authentication will not succeed if recognition does not completely coincide with registered information and thus it is not possible to receive services.

Thus, the present disclosure proposes a novel and improved information processing device, information processing method, and program which enable services associated with user recognition to be provided more flexibly.

Solution to Problem

According to an embodiment of the present disclosure, there is provided an information processing apparatus including circuitry configured to obtain, from sensors, first and second observation information related to at least one characteristic of a user, recognize the user based on correlation between the first and second observation information, and initiate an execution function associated with the recognized user.

According to another embodiment of the present disclosure, there is provided an information processing method including obtaining, from sensors, first and second observation information related to at least one characteristic of a user; recognizing the user based on correlation between the first and second observation information; and initiating an execution function associated with the recognized user.

Further, according to another embodiment of the present disclosure, there is provided a non-transitory computer-readable medium having embodied thereon a program, which when executed by a computer having causes the computer to execute a method, the method including obtaining, from sensors, first and second observation information related to at least one characteristic of a user; recognizing the user based on correlation between the first and second observation information; and initiating an execution function associated with the recognized user.

Advantageous Effects of Invention

According to embodiments of the present disclosure described above, services associated with user recognition can be provided more flexibly. Note that the effects described above are not necessarily limitative, and along with or instead of the effects, any effect disclosed in the present specification, or another effect that can be understood from the present specification may be exhibited.

BRIEF DESCRIPTION OF DRAWINGS

FIG. 1 is a diagram illustrating an overview of an information processing system according to an embodiment.

FIG. 2 is a block diagram showing an example of a logical configuration of the information processing system according to an embodiment.

FIG. 3 is a diagram illustrating an example of placement of observation devices according to an embodiment.

FIG. 4 is a diagram for describing an example of services provided by the information processing system according to an embodiment.

FIG. 5 is a flowchart showing an example of the flow of a DB updating process executed by a server according to an embodiment.

FIG. 6 is a flowchart showing an example of the flow of a recognition process executed by the server according to an embodiment.

FIG. 7 is a flowchart showing an example of the flow of an information provision process executed by the server according to an embodiment.

FIG. 8 is an illustrative diagram for describing a specific example of the information processing system according to an embodiment.

FIG. 9 is an illustrative diagram for describing a specific example of the information processing system according to an embodiment.

FIG. 10 is an illustrative diagram for describing a specific example of the information processing system according to an embodiment.

FIG. 11 is an illustrative diagram for describing a specific example of the information processing system according to an embodiment.

FIG. 12 is an illustrative diagram for describing a specific example of the information processing system according to an embodiment.

FIG. 13 is an illustrative diagram for describing a specific example of the information processing system according to an embodiment.

FIG. 14 is an illustrative diagram for describing a specific example of the information processing system according to an embodiment.

FIG. 15 is a flowchart showing an example of the flow a daily process executed by the server according to an embodiment.

FIG. 16 is a flowchart showing an example of the flow a daily process executed by the server according to an embodiment.

FIG. 17 is a flowchart showing an example of a recognition result history modification process executed by the server according to an embodiment.

FIG. 18 is a block diagram showing an example of a hardware configuration of an information processing device according to an embodiment.

DESCRIPTION OF EMBODIMENT

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and drawings, there are cases in which constituent elements having substantially the same functional configuration are distinguished by giving an alphabetic suffix to the same reference numeral. For example, a plurality of constituent elements having substantially the same functional configuration will be distinguished, as in terminal devices 100A, 100B, and 100C, when necessary. When there is no particular need to distinguish a plurality of constituent elements having substantially the same functional configuration, however, only the same reference numeral will be given thereto. For example, when there is no particular need to distinguish the terminal devices 100A, 100B, and 100C, they are simply referred to as terminal devices 100.

Note that description will be provided in the following order.
1. Overview
2. First embodiment
2.1. Configuration example
2.2 Technical characteristics
2.3. Process flow
2.4. Specific examples
3. Hardware configuration example
4. Conclusion

1. Overview

First, an overview of an information processing system according to an embodiment of the present disclosure will be described with reference to FIG. 1.

FIG. 1 is an illustrative diagram for describing the overview of the information processing system according to an embodiment. As shown in FIG. 1, a terminal device 100 is a device that is hung on a ceiling and displays (in other words, projects) information on the top surface of a table 10. The terminal device 100 provides a user with services according to user operations with respect to information displayed on the table 10. Such a form of outputting information on the top surface of the table 10 is also called a table-top screen.

The terminal device 100 includes an observation unit that is not illustrated in the drawing (the observation unit 110 shown in FIG. 2) such as an image sensor, a depth sensor, and a microphone to observe information pertaining to a user. For example, the terminal device 100 sets a region on the table 10 as an observation region 20 and performs observation on an object within the observation region 20. In the example shown in FIG. 1, the terminal device 100 can observe the position of a hand of the user, the shape of the user's hand or clothes, and a motion of the hand when these are positioned within the observation region 20, whether a fingertip of the user is in contact with the table 10, and the like.

The terminal device 100 includes an output unit that is not illustrated in the drawing (the output unit 120 shown in FIG. 2) such as a projector and a speaker to output information to the user. For example, the terminal device 100 sets a region on the table 10 as a display region 30, and outputs an application screen and the like. Note that the observation region 20 and the display region 30 may not coincide.

A face recognition technology that has been widely used as a user recognition technology is difficult to use in a case in which only a hand of a user is observed as shown in FIG. 1. In addition, there are cases in which, even though it is possible to observe a face, it is difficult to recognize the user only using the face recognition technology due to a change of a facial expression, a change of a physical condition, whether the user is wearing glasses, and the like. Thus, it is desired to provide a technology of recognizing a user based on a factor other than a face.

Furthermore, there are cases in which, for example, even if the physique, hair style, clothes, and the like of a user are used in user recognition, clothes, in particular, may change every day or even throughout the day, and thus it is difficult to accurately recognize the user.

Therefore, the information processing system according to an embodiment of the present disclosure has been created focusing on the above-described circumstances. The information processing system according to an embodiment can provide services associated with user recognition more flexibly. This concludes description of the overview of the information processing system according to an embodiment.

2. First Embodiment

Next, a configuration example of the information processing system according to an embodiment will be described with reference to FIGS. 2 and 3.

2.1. Configuration Example

FIG. 2 is a block diagram showing an example of a logical configuration of the information processing system 1 according to an embodiment. As shown in FIG. 2, the information processing system 1 includes the terminal device 100, an observation device 200, and a server 300.
(1) Terminal Device 100

As shown in FIG. 2, the terminal device 100 includes the observation unit 110 and the output unit 120.

The observation unit 110 has a function of acquiring information representing an observation result pertaining to a user (hereinafter referred to also as observation information). For example, the observation unit 110 includes an image sensor, a depth sensor, a microphone, or the like, to acquire observation information based on image information, depth information, sound information, and the like. In addition to that, observation information such as biological information, position information, or acceleration information can be acquired based on information acquired from an arbitrary sensor device.

The output unit 120 has a function of outputting information to a user. For example, the output unit 120 includes a projector, a display, a touch panel, a vibration device, a speaker, or the like to perform image display, sound output, vibration, flickering of light, or the like.

The terminal device 100 transmits observation information acquired by the observation unit 110 to the server 300, and outputs information received from the server 300 from the output unit 120.

(2) Observation Device 200

As shown in FIG. 2, the observation device 200 includes an observation unit 210. Since the function of the observation unit 210 is the same as that of the observation unit 110, detailed description thereof is omitted here.

Here, the information processing system 1 can include a plurality of observation devices 200. This point will be described with reference to FIG. 3.

FIG. 3 is an illustrative diagram for describing an example of placement of observation devices 200 according to an embodiment. In the example shown in FIG. 3, a plurality of observation devices 200 (i.e., observation devices 200A, 200B, and 200C) are placed in one household. Specifically, the observation device 200A is placed above a mirror in a bathroom, and can observe (for example, photograph) the whole body of a user who has woken up. The observation device 200B is placed above a mirror in the front door entrance, and can photograph the whole body of the user who is about to go to work. The observation device 200C is a smartphone, and can photograph the face or the whole body of the user when he or she uses the device to photograph himself or herself. Meanwhile, the terminal device 100 is placed in, for example, the living room, and can photograph, for example, a hand of the user. In this manner, the observation devices 200 can have, for example, the face, and the like of the user as observation targets that are difficult for the terminal device 100 to observe.

Here, when an observation device is provided in the vicinity of a mirror, like the observation devices 200A and 200B, the device can photograph the face and the whole body up to the upper body of the user from the front. Thus, the server 300 can accurately recognize the user observed by the observation device 200A or 200B. In addition, a personal observation device 200 of the user like the observation device 200C can acquire the user name and an image in association, and thus a burden of recognition imposed on the server 300 is reduced. Furthermore, the observation devices 200 may be a monitoring camera, a camera of an intercom, or the like, and in that case, existing equipment can be effectively used.

Note that, although the observation devices 200 are realized as cameras that can photograph images in the example shown in FIG. 3, the present technology is not limited thereto. For example, the observation devices 200 can be realized as various devices such as a microphone, a biosensor, an inertial sensor (such as a gyro sensor or an acceleration sensor), a light sensor, and the like.

The information processing system 1 may include a plurality of terminal devices 100 like the observation devices 200, and the plurality of terminal devices 100 may be placed in, for example, one household.

(3) Server 300

As shown in FIG. 2, the server 300 includes an acquisition unit 310, a recognition unit 320, a storage control unit 330, and an output control unit 340. Note that the server 300 can further include constituent elements other than these constituent elements. In other words, the server 300 can perform operations other than operations of these constituent elements. Functions of the acquisition unit 310, the recognition unit 320, the storage control unit 330, and the output control unit 340 will be described in detail below.

(4) Database (DB) 400

A DB 400 functions as a storage unit that temporarily or permanently stores various kinds of data. For example, the DB 400 stores observation information observed by the terminal device 100 or the observation device 200.

The configuration example of the information processing system according to an embodiment has been described above. Next, technical characteristics of the information processing system 1 according to an embodiment will be described.

2.2. Technical Characteristics (1) Outline

The information processing system 1 recognizes a user and provides services corresponding to the recognized user. An outline of a basic process of the information processing system 1 will be descried below.

(a) Accumulation of Observation Information

The server 300 (for example, the acquisition unit 310) acquires observation information observed by the terminal device 100 or the observation device 200. Then, the server 300 (for example, the storage control unit 330) causes the acquired observation information to be stored in the DB 400 in association with the user recognized from a recognition process to be described below. Accordingly, observation information of each user is accumulated in the DB 400. In addition, when a change of a user is recognized from the recognition process to be described below, the server 300 causes the change of the user to be stored in the DB 400. Accordingly, the information stored in the DB 400 reflects the latest situation of the user.

(b) Recognition Process

The server 300 (for example, the acquisition unit 310) acquires observation information observed by the terminal device 100 or the observation device 200. In addition, the server 300 (for example, the storage control unit 330) acquires observation information stored in the DB 400. Here, observation information to be observed and acquired in real time is also referred to as first observation information, and observation information of the past accumulated in the DB 400 is also referred to as second observation information. In addition, the first and second observation information will be collectively referred to as observation information when there is no particular need to distinguish the information.

The server 300 (for example, the recognition unit 320) recognizes a user and a change of the user. Specifically, the server 300 recognizes a user and a change of the user by collating the acquired first observation information with at least a part of the second observation information stored in the DB 400. For example, when a ratio of information of the first observation information which coincides with the second observation information is high, the server 300 determines that the user relating to the first observation information is a user associated with the second observation information. Then, the server 300 recognizes information of the first observation information that does not coincide with the second observation information as a change of the user.

A recognition process will be described on the assumption of the placement example shown in FIG. 3. For example, the server 300 recognizes a user by collating a captured image of a hand part of the user photographed by the terminal device 100 (first observation information) with a hand part of a captured image of the whole body of the user that was photographed by the observation device 200 (second observation information). In addition, the server 300 recognizes that the user has changed clothes by collating a captured image of the whole body of the user before going to work photographed by the observation device 200B (first observation information) with a captured image of the whole body of the user who has just woken up photographed by the observation device 200A (second observation information). In this manner, the server 300 can recognize the user and a change of the user when the first observation information and the second observation information partly coincide with each other and partly differ from each other.

As an example, a change of clothes will be further described. The server 300 may trace an action like changing clothes, or putting on or taking off a jacket and update the DB 400 every time the action is performed. Accordingly, the server 300 can recognize the user after changing clothes even using a small image in which it is hard to recognize the face, or an image in which the face is not captured.

(c) Provision of Services

The server 300 (for example, the output control unit 340) controls output according to a recognition result. For example, the server 300 causes the terminal device 100 to output content according to a recognition result of the user and a recognition result of a change of the user. The content can include a screen, an image (a still image or a dynamic image), a sound such as background music, or the like of an application. Examples of services provided by the information processing system 1 will be described below with reference to FIG. 4.

FIG. 4 is an illustrative diagram for describing examples of services provided by the information processing system 1 according to an embodiment. In FIG. 4, the examples of the services provided according to user's daily actions are shown. The user is assumed to have photographed his or her own face and performed user registration using the observation device 200C in preparation. For example, the server 300 performs user registration by causing the DB 400 to store identification information newly given to the user in association with a face image of the user. In this case, attribute information such as the name of the user may be registered through a user input.

For example, the server 300 recognizes the user and a characteristic of clothes of the user based on a captured image of the user who woke up and is washing his or her face observed by the observation device 200A, and causes information representing the characteristic of the clothes of the user to be stored in the DB 400. The server 300 can recognize the user who has just woken up based on the clothes of the user. Then, the server 300 causes the terminal device 100 to automatically display a screen 42 of a news application for the user having breakfast 41 on the table 10.

In addition, the server 300 recognizes the user and a characteristic of clothes of the user based on a captured image of the user who has finished his or her work and come back home observed by the observation device 200B, and causes information representing the characteristic of the clothes of the user to be stored in the DB 400. The server 300 can recognize the user who has come back home after work by the clothes of the user. Then, the server 300 causes the terminal device 100 to automatically display a screen 44 of a schedule application showing a schedule of the next day for the user having dinner 43 on the table 10.

Note that, in the present specification, output of information by the information processing system 1 and output of information by the terminal device 100 have the same meaning as output of information from the terminal device 100 by the server 300.

(2) Observation Information (a) Content

Observation information can be variously considered. Observation information can include at least any of information representing an example below.

Information Representing Characteristics with Regard to the Body of a User

Observation information can include, for example, information representing characteristics with regard to the body of a user shown below. The observation information may be acquired using, for example, a bio-sensor, or recognized based on arbitrary information such as a captured image or a collected sound.

Characteristics of a Face
Physical Characteristics
Shape of a hand when a gesture is made
Physique
Weight
Age
Sex
Pulse
Body odor
Speed and depth of breath
Body temperature
Voice
Width of a step
Dominant hand
Skin color Characteristics with Regard to Actions of a User Observation information can include, for example, information representing characteristics with regard to actions of a user shown below. The observation information may be acquired using, for example, an inertial sensor, or recognized based on arbitrary information such as a captured image or a collected sound.

Actions
Motion
Position
Preference
Frequently viewed content
First button pressed
Habits
Frequency of unconscious shaking of a foot
Humming
Reaction to intense light (a characteristic way of showing surprise such as blinking)
Reaction to vibration of a device
Reaction to a sound of a mosquito
Reaction of a user who is upset about a waiting time that is deliberately made
Reaction when a picture of an animal or food is provided.
Way of closing a door
Way of swinging the body while standing
Way of folding arms
Way of pointing with an arm (or a finger)
Way of scratching the head
Way of saying the end of a word
Way of holding chopsticks
Way of holding a pen
Handwriting
Characteristic (a Size, a Shape, Etc.) in a Figure (a Circle, a Square, Etc.) Drawn on the Top Surface of a Table, Etc.

Sound of footsteps
Position for boarding a vehicle
Characteristics with Regard to the Life of a User Observation information can include, for example, information representing characteristics with regard to the life of a user shown below. The observation information may be recognized based on arbitrary information, for example, a captured image, a collected sound, information acquired from a web, or the like.

Living Environment
Place at which a user frequently sits
From which direction a user enters an angle of view (e.g., a mother often enters the angle of view from the kitchen side, etc.)
Sleeping position
History of opening and closing a door
Tableware (user's own mug, chopsticks, etc.)
Life Rhythm
Wake-up time
Seating order at a table
Speed of eating
Order of eating
Roles (emptying a trash can, laundry)
Human Relations
Information in a social media
Characteristics with Regard to Objects that a User Wears or Carries Observation information can include, for example, information representing characteristics with regard to objects that a user wears or carries as shown below. The observation information may be recognized based on arbitrary information, for example, a captured image, information acquired using an infrared sensor, information representing possessions of the user stored in the DB 400.

Accessories
Head: hats, wigs, hair colors
Face: glasses, earrings
Neck: scarves, necklaces
Wrist: wrist watches, rings, gloves, nail polish
Body: necktie pins, key holders, neckties, clothes (colors, patterns, logos of brands, etc.)
Leg: pants, skirts, shoes, slippers, socks
Accessories that Store Information
A ring or a bracelet on which a pattern is printed using IR-reflective paint (b) Acquisition Process As described above, observation information is information representing characteristics of a user. The terminal device 100 or the observation device 200 acquires observation information by performing a recognition process on raw data obtained from various sensor devices, and transmits the observation information to the server 300. Note that raw data may be transmitted to the server 300 and observation information may be obtained by the server 300.

(3) Degree of Certainty of User Recognition

The server 300 (for example, the recognition unit 320) recognizes a user and a change of the user by collating acquired first observation information with at least a part of second observation information stored in the DB 400.

Here, there are cases in which it is difficult to reliably recognize the user even when a part of observation information coincides, for example, when clothes of the user coincide with those of another user. For this reason, the server 300 performs user recognition with an open probability (accuracy). The probability of user recognition is also referred to as a degree of certainty below. A degree of certainty of a recognition result obtained using a face recognition technology, for example, is set to be the highest, and a degree of certainty gradually decreases in order of a physical characteristic, and a habit. This order can be set based on erroneous recognition rates. In addition, with regard to clothes, a degree of certainty of a recognition result based on unicolor clothes may be set to be, for example, low, and a degree of certainty of a recognition result based on clothes with many patterns (i.e., a large amount of features) may be set to be high.

The server 300 can perform a process for improving a degree of certainty of user recognition. For example, the server 300 may perform user recognition by combining a plurality of kinds of observation information. Specifically, the server 300 can improve the probability of user recognition by combining coincidence of the shape of a hand with coincidence of clothes. In this manner, by performing user recognition by combining a plurality of kinds of observation information, robustness in recognition improves, and false impersonation using clothes is prevented. In addition, the server 300 may improve a degree of certainty of user recognition by combining observation information obtained from another terminal device 100 or observation device 200 in addition to that of the terminal device 100.

(4) Output According to a Degree of Certainty

The server 300 (for example, the output control unit 340) may control output according to degrees of certainty. For example, the server 300 can perform output in different forms according to degrees of certainty, e.g., the server causes general information to be output when a degree of certainty is low, and causes information that is more customized to a user to be output as the degree of certainty increases. Accordingly, even when user recognition is uncertain, for example, flexible provision of services in which at least some kinds of information can be provided to a user is realized.

The server 300, for example, may cause information representing a degree of certainty to be output. For example, the server 300 may change the color, depth, or the like of a display object to be displayed, like a pointer, according to degrees of certainty, and may cause a meter indicating degrees of certainty to go up or go down. Furthermore, the server 300 may cause the magnitude of a degree of certainty to be output as a sound. Accordingly, a user can know the probability of user recognition. This characteristic will be described in detail below with reference to FIG. 9.

For example, the server 300 may control whether or not the information relating to privacy of the recognized user can be output according to degrees of certainty. For example, the server 300 does not cause information relating to privacy of the user to be output when a degree of certainty does not exceed a threshold value, and causes the information to be output when a degree of certainty exceeds the threshold value. The number of threshold values of a degree of certainty may be set to be plural, and the range of information that can be caused to be output by the server 300 may increase as a degree of certainty increases. With such control, phased output according to degrees of certainty is possible, and privacy of the user is properly protected. Note that, in a circumstance in which only family members use the terminal device 100, the threshold value of a degree of certainty can be set to be eased. This characteristic will be described in detail below with reference to FIG. 8.

The server 300 may cause, for example, information representing the threshold value of a degree of certainty relating to whether or not information is to be output to be output. Accordingly, the user can understand that desired information is not output because a degree of certainty is insufficient, and thus can perform an action to improve the degree of certainty like logging in using a password, or the like.

Furthermore, the server 300 may cause information prompting the user to perform an action for improving a degree of certainty to be output. In other words, the server 300 may cause information prompting the user to perform an action of increasing first observation information (for example, information instructing an action to be performed) to be output. If the user performs an action according to this information, the server 300 can further improve a degree of certainty of user recognition. In addition, the server 300 may cause information representing that output information is information prompting the user to perform an action for improving a degree of certainty to be output. This characteristic will be described in detail below with reference to FIG. 13.

For example, the server 300 may control an output destination of information according to a degree of certainty. For example, the server 300 may cause information for a user who has been identified with a high degree of certainty to be output in the vicinity of the user, at the center of a table, or the like. On the other hand, the server 300 may cause information for a user who has been identified with a low degree of certainty to be output at a default display position, at the center of a plurality of users, or the like.

(5) Time-Series Learning (a) Updating of Information of the DB 400

The server 300 (for example, the storage control unit 330) updates second observation information stored in the DB 400 according to a recognition result. Accordingly, the information stored in the DB 400 reflects the latest situation of a user, and thus accuracy in user recognition can be further improved.

The server 300 performs updating by, for example, adding or replacing first observation information relating to a change of a user to or with second observation information associated with a recognized user. This point will be described with reference to examples of second observation information to be stored in the DB 400 shown in Table 1.

TABLE 1

| Categories | Present | History |
|---|---|---|
| Clothes | Clothes that the user is wearing | Clothes that the user owns |
| Position | Current Global Navigation Satellite System (GNSS) information | Position information of residence, position information of office |
| Action | Current action | Actions and habits of the past |
| Human relation | Who the user is currently with | People with whom the user mostly spends time, family members |
| . . . | . . . | . . . |

As shown in Table 1 above, the DB 400 can store information with respect to the "present" and information with respect to the "history" for each category. For example, the server 300 performs a recognition process by collating observed information with information with respect to the "present" stored in the DB 400. Here, when the observed information does not coincide with the information with respect to the "present" stored in the DB 400, the server 300 may perform the recognition process by collating the information with the information with respect to the "history." When a change is recognized, the server 300 updates the information with respect to the "present," and when information corresponding to the change is not in the "history," the server updates the information with respect to the "history."

When a user has changed clothes, for example, the server 300 replaces the information representing "clothes that the user is wearing" with information representing the changed clothes. In addition, when the user is wearing new clothes that are not included in the history, the server 300 adds information representing the new clothes to "clothes that the user owns." In this manner, the second observation information stored in the DB 400 is updated with information reflecting the latest situation of the user. Note that, with regard to clothes, when a situation of the user changing his or her clothes is observed, the server 300 can update the DB 400 more easily because it is possible to recognize the user based on the clothes before changing.

The server 300 may update information stored in the DB 400 based on various kinds of information, in addition to information obtained by the terminal device 100 or the observation device 200. For example, the server 300 may update the second observation information based on a purchase history of the user. When the user has purchased new clothes on the web, for example, the server 300 acquires information relating to the purchase from the web, and adds information representing the purchased new clothes to "clothes that the user owns" shown in Table 1.

Accordingly, the server 300 can recognize the user by collating the history even when the user wears new clothes, and thus an erroneous recognition probability can be lowered.

(b) Modification of Information of the DB 400

The server 300 may modify information stored in the DB 400. For example, the server 300 provides information representing a recognition result to a user and performs modification based on a user instruction.

In detail, the server 300 (the output control unit 340) causes information representing the history of a recognition result to be output to a recognized user. The server 300 causes, for example, information representing the history of daily recognition results of the user (for example, the history of information representing positions at which the user was recognized, and actions and clothes by which the user was recognized) to be displayed. Accordingly, the user can think back on his or her day. In addition, the server 300 (the storage control unit 330) updates the second observation information stored in the DB 400 according to a user operation with respect to the output information representing the history of the recognition result. Accordingly, the user can modify an erroneous recognition result. This characteristic will be described in detail below with reference to FIGS. 14 to 17.

The technical characteristics of the information processing system 1 according to an embodiment have been described above. Next, the flows of processes executed by the information processing system 1 according to an embodiment will be described with reference to FIGS. 5 to 7.

2.3. Process Flow (1) DB Updating Process

FIG. 5 is a flowchart showing an example of the flow of an updating process of the DB 400 executed by the server 300 according to an embodiment.

As shown in FIG. 5, the acquisition unit 310 acquires observation information from the terminal device 100 or the observation device 200 (Step S102). Next, the recognition unit 320 recognizes a user and a change of the user (Step S104). For example, the recognition unit 320 recognizes the user and a change of clothes using a face recognition technology based on a captured image of the user acquired by the acquisition unit 310. Note that the process of this case will be described in more detail below with reference to FIG. 6.

Next, the storage control unit 330 determines whether or not the recognized user has been registered in the DB 400 (Step S106). When the user is determined not to have been registered (No in Step S106), the storage control unit 330 gives the recognized user a user ID to perform user registration (Step S108).

Then, the storage control unit 330 determines whether or not there is a change of the user (Step S110). When it is determined that there is a change in the user (Yes in Step S110), the storage control unit 330 update the information stored in the DB 400 (Step S112). With regard to an unregistered user, the storage control unit 330 causes the acquired observation information to be stored in the DB 400 in association with a newly given user ID.

With the steps above, the server 300 finishes the DB updating process.

(2) Recognition Process

FIG. 6 is a flowchart showing an example of the flow of a recognition process executed by the server 300 according to an embodiment. The process of this flow corresponds to Step S104 shown in FIG. 5.

As shown in FIG. 6, first, the recognition unit 320 recognizes a user by collating the first observation information acquired by the terminal device 100 or the observation device 200 with at least a part of the second observation information stored in the DB 400 (Step S202). For example, when only a part of the body is included in a captured image (the first observation information), the recognition unit 320 performs collating with regard to whether or not the part of the body coincide with the second observation information stored in the DB 400. Note that the recognition unit 320 may separate the body of the user from the background to distinguish them using a motion detection process, a background differential detection process or the like. Then, the recognition unit 320 recognizes the user relating to the first observation information as the user associated with the second observation information with the highest degree of coincidence among a plurality of persons stored in the DB 400.

Next, the recognition unit 320 determines whether or not the degree of certainty of the user recognition is equal to or higher than a threshold value (Step S204).

When the degree of certainty is determined to be equal to or higher than the threshold value (Yes in Step S204), the recognition unit 320 determines the recognized user to be a registered user (Step S206). Then, the recognition unit 320 extracts a change of the user (Step S208). For example, the recognition unit 320 extracts a differential of the first observation information and the second observation information as a change of the user.

On the other hand, when the degree of certainty is determined to be lower than the threshold value (No in Step S204), the recognition unit 320 determines that the user that is an observation target of the first observation information is an unregistered user.

The server 300 thereby finishes the recognition process.

(3) Information Provision Process

FIG. 7 is a flowchart showing an example of the flow of an information provision process executed by the server 300 according to an embodiment.

As shown in FIG. 7, first, the acquisition unit 310 acquires observation information from the terminal device 100 or the observation device 200 (Step S302). Then, the recognition unit 320 recognizes a user and a change of the user (Step S304). This process is as described above with reference to FIG. 6. Then, the output control unit 340 causes the terminal device 100 to output the information to the recognized user (Step S306).

The server 300 thereby finishes the information provision process.

2.4. Specific Examples

Next, specific examples will be described with reference to FIGS. 8 to 17.

(1) User Recognition Based on Clothes

First, user recognition of a table-top screen described above with reference to FIG. 1 based on clothes will be described.

User recognition using a face recognition technology is difficult for the terminal device 100 shown in FIG. 1 because the device observes (for example, performs photographing on) the observation region 20 from above and thus the face does not come into the angle of view of the camera.

For this reason, the server 300 may recognize a user using the size, the shape, or the like of a hand that has come into the observation region 20. In addition, the server 300 may recognize a user based on a sleeve of clothes that has come into the observation region 20. For example, the server 300 stores an amount of features of clothes relating to the color and pattern of the clothes in association with the recognized user in advance using a face recognition technology based on a whole-body image of the user obtained by another observation device 200. Then, the server 300 recognizes the user by collating an amount of features of a sleeve of clothes that has come into the observation region 20 with a stored amount of features of a sleeve of clothes. By combining the information, the server 300 can improve a degree of certainty of user recognition.

Even when user recognition is difficult using a face recognition technology, it is possible to recognize a user and provide content customized to the user in that manner. The information processing system 1 may, for example, display content that the recognized user frequently views at the center of the table 10, or display a schedule close to where the user is.

In addition, the information processing system 1 may control output according to degrees of certainty. For example, when a user is recognized based on both the size of a hand and clothes, the information processing system 1 displays content including information relating to privacy of the user. On the other hand, when a user is recognized based on only one of them, the information processing system 1 displays general content. This point will be described with reference to FIG. 8.

FIG. 8 is an illustrative diagram for describing a specific example of the information processing system 1 according to an embodiment. When user recognition is performed based only on the size of a hand and a degree of certainty is low, for example, the information processing system 1 displays a screen 51 of a news application that does not include information relating to privacy of the user. Then, when user recognition is performed based on a sleeve of clothes and a degree of certainty is high, the information processing system 1 displays a screen 52 of a schedule application that includes information relating to privacy of the user.

As an example of content, the information processing system 1 may offer a suggestion on clothes. For example, the server 300 may cause information suggesting changing into a long-sleeve shirt in preparation for a temperature drop in the afternoon, for example, when the recognized user will be spending a long time outside, to be output with reference to a schedule of the recognized user. In addition, when a user is not wearing a suit on a weekday, the server 300 recognizes that the user is probably taking the day off, and causes information of nearby hospitals to be output if the user has a high body temperature, or causes game content to be output if the user has a normal body temperature.

In addition, the information processing system 1 may display information representing a degree of certainty. This point will be described with reference to FIG. 9.

FIG. 9 is an illustrative diagram for describing a specific example relating to the information processing system 1 according to an embodiment. When a degree of certainty is low, for example, the information processing system 1 displays a pointer in a pale color as indicted by the reference numeral 53. On the other hand, when a degree of certainty is high, the information processing system 1 displays the pointer in a dark color as indicated by the reference numeral 54.

(2) User Recognition Based on Accessories

Next, user recognition of the table-top screen shown in FIG. 1 based on accessories will be described with reference to FIG. 10.

FIG. 10 is an illustrative diagram for describing a specific example relating to the information processing system 1 according to an embodiment. In the example shown in FIG. 10, a user is wearing a ring 61 on which an information code (for example, a barcode, a two-dimensional code, or the like) 62 is printed with an IR-reflective paint. The information code 62 stores, for example, user identification information or the like. The terminal device 100 observes the information code 62 that has come into the observation region 20 with an infrared camera or the like.

Accordingly, the server 300 can easily recognize the user.

On top of that, with regard to observation using the infrared camera, use of nail polish that contains an IR-reflective material, a seal on which an IR-reflective pattern is printed, and the like are considered.

(3) User Recognition Based on Biological Information

Next, user recognition of the table-top screen shown in FIG. 1 based on biological information will be described with reference to FIG. 11.

FIG. 11 is an illustrative diagram for describing a specific example relating to the information processing system 1 according to an embodiment. A chair 63 shown in FIG. 11 is provided with pressure sensors in the seat 64 and the feet 65. The chair 63 is placed, for example, near the table 10, and when a user sits on the chair 63, the user's weight is observed. The server 300 stores a user in association with his or her weight in advance based on observation information obtained from, for example, a camera and a scale installed in a bathroom, and recognizes the user by performing collation with the weight observed through the chair 63. Accordingly, the server 300 can recognize the user. A sensor for detecting other biological information such as pulse, body temperature, body odor, breath, or the like may be installed in the chair 63, and the server 300 can improve a degree of certainty of user recognition by combining the information.

(4) User Recognition Based on a Sound

Next, user recognition of the table-top screen shown in FIG. 1 based on a sound will be described with reference to FIG. 12.

FIG. 12 is an illustrative diagram for describing a specific example of the information processing system 1 according to an embodiment. A door 66 connects a living room in which the terminal device 100 is provided and a kitchen. A door 67 connects the living room in which the terminal device 100 is provided and a front entrance. The server 300 stores tendencies of door opening and closing sounds in advance, for example, a father's tendency to open and close the door loudly and a mother's tendency to open and close the door quietly, and recognizes a user by performing collation with opening and closing sounds of the door 66 or 67. Accordingly, the server 300 can recognize a user. The server 300 can improve a degree of certainty of user recognition by combining a sound with another sound such as footsteps, humming, or the like. Instead of an opening and closing sound, strength by which the door is opened and closed may be observed by a sensor installed in a door to be used for user recognition. In addition, the server 300 may recognize a user by adding another tendency such as a mother's frequency of going in and out through the door 66 and a father's frequency of going in and out through the door 67.

(5) User Recognition Based on a Habit

Next, user recognition of the table-top screen shown in FIG. 1 based on a habit will be described.

For example, the server 300 may store habits of a user such as the frequency of unconscious shaking of a foot in advance to recognize the user based on an observed frequency of unconscious shaking of a foot. The server 300 can thereby recognize the user. In addition, the server 300 can improve a degree of certainty of user recognition by combining a habit with other observation information such as clothes. Note that it is desirable to store a habit of a user in a state in which a log-in operation such as performing log-in with an input of password is expected (in other words, in a state in which the user has been reliably recognized). The reason for this is to prevent erroneous recognition.

In the same manner, a recognition process may be performed based on another feature relating to an action and life of a user. Seating positions at a table are generally decided in a household, and thus the server 300 may store the seating positions at the table in advance and recognize users based on the seating positions.

The server 300 may cause information prompting a user to perform an action for improving a degree of certainty to be output. This point will be described with reference to FIG. 13.

FIG. 13 is an illustrative diagram for describing a specific example relating to the information processing system 1 according to an embodiment. In FIG. 13, a display example of information for inducing a "reaction of a user who is upset due to a waiting time that is deliberately made" as a habit of the user is shown. Specifically, the terminal device 100 delays scrolling of a scroll operation on an application screen 71. Furthermore, the terminal device 100 displays an icon 72 indicating that the scroll process is underway. A waiting time is generated due to the delay of scrolling, and thus a "reaction of the user who is upset due to a waiting time that is deliberately made" is induced. Furthermore, the terminal device 100 displays information 73 representing that the delay in the scroll process on the application screen 71 is being caused to prompt the user to perform an action for improving a degree of certainty. Thus, the user can distinguish whether the scrolling is simply delayed or the scrolling is delayed to improve a degree of certainty.

(6) Provision of a History of Recognition Results of a User's Daily Actions

Next, information representing a history of a user's daily actions provided on the table-top screen shown in FIG. 1 will be described with reference to FIGS. 14 to 17.

(a) Examples of Actions of a User

A user is assumed to perform, for example, actions shown in Table 2 below.

TABLE 2

| Time | Action |
| --- | --- |
| 7:15 a.m. | Washing face |
| 7:30 a.m. | Having breakfast + Reading news |
| 8:00 a.m. | Changing into a suit (navy blue) |
| 8:15 a.m. | Leaving home |
| 9:30 a.m. | Arriving at AAA company |
| 12:30 p.m. | Posting a photographed lunch on an SNS |
| 3:00 p.m. | Reading news on the smartphone |
| . . . | . . . |
| 7:00 p.m. | Returning home |

(b) An Example of a UI

FIG. 14 is an illustrative diagram for describing a specific example relating to the information processing system 1 according to an embodiment. The terminal device 100 displays an action check button 81, and when a user touches the action check button 81, the device displays recognition history information 82 representing a history of recognition results of the user's daily actions. The recognition history information 82 includes the recognition results of the user's daily actions shown in Table 2 above. Here, when Table 2 and the recognition history information 82 are compared, erroneous recognition of changing into red clothes at 10:00 a.m. is found. This is, for example, a recognition result of another user. When there is such erroneous recognition, the user causes a deletion window 83 to be displayed by touching the erroneously recognized item, and thus can delete the erroneously recognized item, and the DB 400 is updated based on the deletion.

(c) Process Flow

FIGS. 15 and 16 are flowcharts showing an example of the flow of a daily process executed by the server 300 according to an embodiment.

As shown in FIG. 15, first, the server 300 recognizes a user based on a face image photographed by a camera (observation device 200) in a bathroom (Step S402), and updates the DB 400 for clothes (Step S404).

Next, the server 300 recognizes the user based on an image of clothes (for example, a sleeve) photographed by a camera (terminal device 100) of a dining table (Step S406), and causes news preferred by the recognized user to be displayed (Step S408).

Next, the server 300 recognizes the user based on images of his or her face and clothes photographed by a monitoring camera (observation device 200) in the user's room (Step S410), further recognizes the user who has changed into a suit, and updates the DB 400 for the clothes (Step S412).

Next, the server 300 recognizes the user based on images of his or her face and clothes photographed by a camera (observation device 200) in the front entrance (Step S414), further recognizes the user going out, and updates the DB 400 for the action (Step S416).

Next, the server 300 recognizes the user who has arrived at his or her company through the GNSS and updates the DB for his or her present location as shown in FIG. 16 (Step S418).

Next, the server 300 recognizes the user based on images of his or her face and clothes photographed by a monitoring camera in a locker room (Step S420), further recognizes the user who has changed into red clothes, and updates the DB 400 for the clothes (Step S422). In fact, the user has not changed into red clothes as described above, and thus the recognition is erroneous.

Next, the server 300 recognizes the user who has uploaded a picture of his or her lunch on an SNS and updates the DB 400 for the action (Step S424).

Next, the server 300 recognizes the user who has read news on his or her smartphone, and updates the DB 400 for the reading history (Step S426).

Next, the server 300 recognizes the user based on images of his or her face and clothes photographed by the camera in the front entrance (Step S428), further recognizes the user who has returned home, and updates the DB 400 for the action (Step S430). The process thereby ends.

FIG. 17 is a flowchart showing an example of the flow of a recognition result history modification process executed by the server 300 according to an embodiment.

As shown in FIG. 17, first, the server 300 causes recognition history information to be displayed (Step S502). Next, the server 300 deletes wrong information from the DB 400 according to a user operation (Step S504), and further updates the DB 400 with correct information according to a user operation (Step S506). With respect to the example shown in FIG. 14, the server 300, for example, deletes information representing that the user has changed into red clothes from the DB 400. The process thereby ends.

3. Hardware Configuration Example

Finally, a hardware configuration of an information processing device according to an embodiment will be described with reference to FIG. 18. FIG. 18 is a block diagram showing an example of the hardware configuration of the information processing device according to an embodiment. Note that the information processing device 900 shown in FIG. 18 can realize, for example, the terminal device 100, the observation device 200, the server 300, or the DB 400 shown in FIG. 2. Information processing performed by the terminal device 100, the observation device 200, the server 300, or the DB 400 according to an embodiment can be realized in cooperation with software and hardware described below.

As illustrated in FIG. 18, the information processing device 900 includes a central processing unit (CPU) 901, a read only memory (ROM) 902, a random access memory (RAM) 903 and a host bus 904a. In addition, the information processing device 900 includes a bridge 904, an external bus 904b, an interface 905, an input device 906, an output device 907, a storage device 908, a drive 909, a connection port 911 and a communication device 913. The information processing device 900 may include a processing circuit such as a DSP or an ASIC instead of or in addition to the CPU 901.

The CPU 901 serves as an arithmetic processing unit and a control device and controls overall operations in the information processing device 900 according to various programs. In addition, the CPU 901 may be a microprocessor. The ROM 902 stores a program, a calculation parameter or the like that is used by the CPU 901. The RAM 903 temporarily stores a program that is used when the CPU 901 is executed, and a parameter that is appropriately changed in the execution. The CPU 901 can constitute, for example, the acquisition unit 310, the recognition unit 320, the storage control unit 330, and the output control unit 340 shown in FIG. 2. In addition, the CPU 901 may constitute, for example, a part of the observation unit 110 and the observation unit 210 shown in FIG. 2, and acquire observation information by performing a recognition process on, for example, raw sensor data.

The CPU 901, the ROM 902, and the RAM 903 are connected to one another by the host bus 904a including a CPU bus. The host bus 904a is connected to the external bus 904b such as a Peripheral Component Interconnect/Interface (PCI) bus through the bridge 904. Also, it is not necessary to configure the host bus 904a, the bridge 904 and the external bus 904b separately, but such functions may be implemented in one bus.

The input device 906 is implemented by a device to which information is input by a user, for example, a mouse, a keyboard, a touch panel, a button, a microphone, a switch and a lever. In addition, the input device 906 may be, for example, a remote control device using infrared rays or other radio waves, or may be an external connection device such as a mobile phone or a PDA that responds to a manipulation of the information processing device 900. Further, the input device 906 may include an input control circuit that generates an input signal based on information input by the user using, for example, the above input device, and outputs a signal to the CPU 901. The user of the information processing device 900 may input various types of data or instruct a process operation to the information processing device 900 by manipulating the input device 906.

In addition, the input device 906 can be formed of a sensor that senses information of a user. For example, the input device 906 can include various kinds of sensors such as an image sensor (for example, a camera), a depth sensor (for example, a stereo camera), an acceleration sensor, a gyro sensor, a geo-magnetic sensor, an optical sensor, a sound sensor, a distance measuring sensor, or a force sensor. In addition, the input device 906 may acquire information regarding a state of the information processing device 900 itself such as an attitude or a moving speed of the information processing device 900, or information regarding a peripheral environment of the information processing device 900 such as brightness or noise of the periphery of the information processing device 900. Furthermore, the input device 906 may include a Global Navigation Satellite System (GNSS) module which measures the latitude, longitude, and altitude of a device by receiving a GNSS signal (for example, a Global Positioning System (GPS) signal from a GPS satellite) from a satellite of the GNSS.

The input device 906 may constitute, for example, a part of the observation unit 110 and the observation unit 210 shown in FIG. 2, and then receive inputs of, for example, raw sensor data.

The output device 907 is formed as a device capable of visually or audibly notifying the user of the acquired information. Such a device includes a display device such as a projector, a CRT display device, a liquid crystal display device, a plasma display device, an EL display device, a laser projector, an LED projector and a lamp, an audio output device such as a speaker and a headphone, a printer device or the like. The output device 907 outputs results obtained by various processes performed by, for example, the information processing device 900. Specifically, the display device visually displays results obtained by various processes performed by the information processing device 900 in various forms such as text, an image, a table, or a graph. On the other hand, the audio output device converts an audio signal of reproduced audio data or acoustic data into an analog signal and audibly outputs the result. The display device and the audio output device may constitute, for example, the output unit 120 illustrated in FIG. 2.

The storage device 908 is a device for data storage formed as an example of the storage unit of the information processing device 900. The storage device 908 is implemented by, for example, a magnetic storage device such as an HDD, a semiconductor storage device, an optical storage device or a magneto optical storage device. The storage device 908 may include a storage medium, a recording device configured to record data in the storage medium, a reading device configured to read data from the storage medium, and a deleting device configured to delete data recorded in the storage medium. The storage device 908 stores a program and various types of data executed by the CPU 901 and various types of data acquired from the outside. The storage device 908 may form, for example, the DB 400 illustrated in FIG. 2.

The drive 909 is a reader-writer for the storage medium and is built in the information processing device 900 or externally attached. The drive 909 reads information recorded in a removable storage medium such as an installed magnetic disk, an optical disc, a magneto optical disc, or a semiconductor memory, and outputs the information to the RAM 903. In addition, the drive 909 can write information in the removable storage medium.

The connection port 911 is an interface connected to an external device and is connection port of the external device capable of transmitting data through, for example, Universal Serial Bus (USB).

The communication device 913 is a communication interface formed in a communication device for connection with, for example, a network 920. The communication device 913 is a communication card for, for example, a wired or wireless local area network (LAN), Long Term Evolution (LTE), Bluetooth (registered trademark), or wireless USB (WUSB). In addition, the communication device 913 may be a router for optical communication, a router for Asymmetric Digital Subscriber Line (ADSL), or a modem for various types of communication. The communication device 913 can transmit and receive a signal or the like in compliant with a predetermined protocol, for example, TCP/IP, through, for example, the Internet, or with other communication devices. In an embodiment, the communication device 913 is included each of the terminal device 100, the observation device 200, the server 300 and the DB 400 and enables mutual transmission and reception of data.

Also, the network 920 is a wired or wireless transmission path of information that is transmitted from a device connected to the network 920. For example, the network 920 may include a public network such as the Internet, a telephone line network, and a satellite communication network, various types of local area networks (LANs) including Ethernet (registered trademark), and a wide area network (WAN). In addition, the network 920 may include a dedicated line network such as Internet Protocol-Virtual Private Network (IP-VPN).

The exemplary hardware configuration in which functions of the information processing device 900 according to an embodiment can be implemented has been illustrated above. The respective components described above may be implemented using a general purpose member or may be implemented by hardware that is specialized for functions of respective components. Therefore, it is possible to appropriately change a hardware configuration to be used according to a technical level when an embodiment is implemented.

Note that a computer program for implementing the above-described respective functions of the information processing device 900 according to an embodiment can be prepared and installed in a PC or the like. In addition, it is possible to provide a computer readable recording medium in which such a computer program is stored. The recording medium includes, for example, a magnetic disk, an optical disc, a magneto optical disc and a flash memory. In addition, the computer program may be delivered through, for example, a network, without using the recording medium.

4. Conclusion

Embodiments of the present disclosure has been described above in detail with reference to FIGS. 1 to 18. The server 300 acquires first observation information representing an observation result with respect to a user, recognizes the user and a change of the user by collating the acquired first observation information with at least a part of stored second observation information, and controls output according to the recognition result as described above. Since the server 300 can recognize not only the user but also the change of the user, services associated with user recognition can be provided more flexibly.

The server 300 provides services according to, for example, a degree of certainty of user recognition. Accordingly, even when user recognition is not reliable, for example, flexible provision of services in which at least some information can be provided to the user is realized.

In addition, the server 300 updates the second observation information stored in the DB 400 according to the recognition result. Accordingly, information stored in the DB 400 reflects the latest situation of the user, and thus accuracy in recognition of the user and the change of the user can be further improved.

It should be understood by those skilled in the art that various modifications, combinations, sub-combinations and alterations may occur depending on design requirements and other factors insofar as they are within the scope of the appended claims or the equivalents thereof.

Although an example in which the terminal device 100 is realized as a table-top screen device has been shown in embodiments described above, for example, the present technology is not limited thereto. The terminal device 100 may be realized as, for example, various types of devices such as a smartphone, a tablet terminal, a PC, a spatially installed terminal such as digital signage, or a car navigation system.

In addition, although the example in which the information processing system 1 includes the terminal device 100, the observation device 200, the server 300, and the DB 400 that are formed separately from each other has been described in the above embodiments, the present technology is not limited thereto. For example, the server 300 and the DB 400 may be included in the terminal device 100 and the observation device 200. In such a case, the terminal device 100 and the observation device 200 can recognize a user and provide services as a single unit. It is desirable for the terminal device 100 and the observation device 200 to share observation information with each other.

Note that it is not necessary for the processing described in this specification with reference to the flowcharts to be executed in the order shown in the flowcharts. Some processing steps may be performed in parallel. Further, some of additional steps can be adopted, or some processing steps can be omitted.

In addition, the effects described in the present specification are merely illustrative and demonstrative, and not limitative. In other words, the technology according to embodiments of the present disclosure can exhibit other effects that are evident to those skilled in the art along with or instead of the effects based on the present specification.

Additionally, the present technology may also be configured as below.

(1) An information processing apparatus including:
circuitry configured to
obtain, from sensors, first and second observation information related to at least one characteristic of a user,
recognize the user based on correlation between the first and second observation information, and
initiate an execution function associated with the recognized user.

(2) The information processing apparatus according to (1), wherein the sensors include a plurality of at least one type of sensor.

(3) The information processing apparatus according to (1) or (2), wherein the circuitry is further configured to determine a change of the user by collating the first observation information with at least part of the second observation information.

(4) The information processing apparatus according to any of (1) to (3), wherein the second observation information is stored into a computer-readable medium when the change of the user is determined.

(5) The information processing apparatus according to any of (1) to (4), wherein the circuitry is further configured to control initiation of the execution function associated with the recognized user based on a degree of certainty of the recognition.

(6) The information processing apparatus according to any of (1) to (5), wherein the circuitry is further configured to initiate a general execution function associated with the recognized user when the degree of certainty is below a threshold value.

(7) The information processing apparatus according to any of (1) to (6), wherein the circuitry is further configured to initiate a customized execution function associated with the recognized user when the degree of certainty is above a threshold value.

(8) The information processing apparatus according to any of (1) to (7), wherein the circuitry is further configured to determine the degree of certainty based on whether a coincidence result is obtained from using a face recognition, physical characteristic detection, or a habit detection.

(9) The information processing apparatus according to any of (1) to (8), wherein the degree of certainty is improved by combining a plurality of types of observation information.

(10) The information processing apparatus according to any of (1) to (9), wherein the execution function is related to a displaying or handing of information related to privacy of the recognized user.

(11) The information processing apparatus according to any of (1) to (10), wherein the circuitry initiates the execution function when the degree of certainty is below a threshold value.

(12) The information processing apparatus according to any of (1) to (11), wherein the circuitry initiates the execution function when the degree of certainty is above a threshold value.

(13) The information processing apparatus according to any of (1) to (12), wherein the circuitry is further configured to display a recognition result based on the recognition of the user.

(14) The information processing apparatus according to any of (1) to (13), wherein the circuitry is further configured to initiate display of an interface for allowing the user to manipulate the recognition result.

(15) The information processing apparatus according to any of (1) to (14), wherein the sensors comprise at least one selected from a group comprising an image sensor, a depth sensor, a pressure sensor, and a microphone.

(16) The information processing apparatus according to any of (1) to (15), wherein the execution function is provided via at least one selected from a group comprising a projector, a display, a touch panel, a vibration device, and a speaker.

(17) The information processing apparatus according to any of (1) to (16), wherein the circuitry is further configured to initiate a storage, into a computer-readable medium upon which the second observation information is stored, of the first observation information in place of the second observation information.

(18) The information processing apparatus according to any of (1) to (17), wherein the first observation information is acquired in real time.

(19) An information processing method executed via a processor having circuitry, the method comprising:
obtaining, from sensors, first and second observation information related to at least one characteristic of a user;
recognizing the user based on correlation between the first and second observation information; and
initiating an execution function associated with the recognized user.

(20) A non-transitory computer-readable medium having embodied thereon a program, which when executed by a computer having causes the computer to execute a method, the method comprising:
obtaining, from sensors, first and second observation information related to at least one characteristic of a user;
recognizing the user based on correlation between the first and second observation information; and
initiating an execution function associated with the recognized user.

(21)
An information processing device including:
an acquisition unit configured to acquire first observation information representing an observation result with respect to a user;
a recognition unit configured to recognize the user and a change of the user by collating the first observation information acquired by the acquisition unit with at least a part of second observation information stored in a storage unit; and
an output control unit configured to control output according to a recognition result obtained by the recognition unit.

(22)
The information processing device according to (21), wherein the output control unit controls output according to a degree of certainty that indicates a probability of user recognition.

(23)
The information processing device according to (22), wherein the output control unit causes information representing the degree of certainty to be output.

(24)
The information processing device according to (22) or (23), wherein the output control unit controls whether or not information regarding privacy of the recognized user is to be output according to the degree of certainty.

(25)
The information processing device according to (24), wherein the output control unit causes information representing a threshold value of the degree of certainty relating to whether or not the output is performed to be output.

(26)
The information processing device according to any one of (22) to (25), wherein the output control unit causes information prompting the user to perform an action for improving the degree of certainty to be output.

(27)
The information processing device according to any one of (22) to (26), wherein the output control unit controls an output destination of information according to the degree of certainty.

(28)
The information processing device according to any one of (21) to (27), further including:
a storage control unit configured to update the second observation information stored in the storage unit according to the recognition result.

(29)
The information processing device according to (28), wherein the storage control unit adds or replaces the first observation information relating to the change to or with the second observation information associated with the recognized user.

(30)
The information processing device according to (28) or (29), wherein the output control unit causes information representing a history of the recognition result to be output, with regard to the recognized user.

(31)
The information processing device according to (30), wherein the storage control unit updates the second observation information stored in the storage unit according to a user operation with respect to information representing the history of the recognition result.

(32)
The information processing device according to any one of (28) to (31), wherein the storage control unit updates the second observation information based on a purchase history of the user.

(33)
The information processing device according to any one of (21) to (32), wherein the first observation information and the second observation information include at least any of information representing a characteristic with respect to a body of the user, information representing a characteristic with respect to an action of the user, information representing a characteristic with respect to life of the user, and information representing a characteristic with respect to an object that the user wears or carries.

(34)
An information processing method including:
acquiring first observation information representing an observation result with respect to a user;
recognizing the user and a change of the user with a processor by collating the acquired first observation information with at least a part of second observation information stored in a storage unit; and
controlling output according to a recognition result.

(35)
A program causing a computer to function as:
an acquisition unit configured to acquire first observation information representing an observation result with respect to a user;
a recognition unit configured to recognize the user and a change of the user by collating the first observation information acquired by the acquisition unit with at least a part of second observation information stored in a storage unit; and
an output control unit configured to control output according to a recognition result obtained by the recognition unit.

REFERENCE SIGNS LIST 1 information processing system
10 table
20 observation region
30 display region
100 terminal device
110 observation unit
120 output unit
200 observation device
210 observation unit
300 server
310 acquisition unit
320 recognition unit
330 storage control unit
340 output control unit
400 DB

The invention claimed is:

1. An information processing apparatus comprising:
circuitry configured to
obtain, from sensors, first and second observation information related to at least one characteristic of a user,
recognize the user based on correlation between the first and second observation information,
wherein the correlation includes an amount of information of the first observation information which coincides with the second observation information,
determine, when the user is recognized, information of the first observation information that does not coincide with the second observation information as a change of the user, and
initiate an execution function associated with the recognized user or the change of the user.

2. The information processing apparatus according to claim 1, wherein the sensors include a plurality of at least one type of sensor.

3. The information processing apparatus according to claim 1, wherein the circuitry is further configured to
determine the change of the user by collating the first observation information with at least part of the second observation information.

4. The information processing apparatus according to claim 3, wherein the second observation information is stored into a computer-readable medium when the change of the user is determined.

5. The information processing apparatus according to claim 1, wherein the circuitry is further configured to
control initiation of the execution function associated with the recognized user based on a degree of certainty of the recognition.

6. The information processing apparatus according to claim 5, wherein the circuitry is further configured to
initiate a general execution function associated with the recognized user when the degree of certainty is below a threshold value.

7. The information processing apparatus according to claim 5, wherein the circuitry is further configured to
initiate a customized execution function associated with the recognized user when the degree of certainty is above a threshold value.

8. The information processing apparatus according to claim 5, wherein the circuitry is further configured to
determine the degree of certainty based on whether a coincidence result is obtained from using a face recognition, physical characteristic detection, or a habit detection.

9. The information processing apparatus according to claim 8, wherein the degree of certainty is improved by combining a plurality of types of observation information.

10. The information processing apparatus according to claim 5, wherein the execution function is related to a displaying or handing of information related to privacy of the recognized user.

11. The information processing apparatus according to claim 10, wherein the circuitry initiates the execution function when the degree of certainty is below a threshold value.

12. The information processing apparatus according to claim 10, wherein the circuitry initiates the execution function when the degree of certainty is above a threshold value.

13. The information processing apparatus according to claim 1, wherein the circuitry is further configured to
initiate display of a recognition result based on the recognition of the user.

14. The information processing apparatus according to claim 13, wherein the circuitry is further configured to
initiate display of an interface for allowing the user to manipulate the recognition result.

15. The information processing apparatus according to claim 1, wherein the sensors comprise at least one selected from a group comprising an image sensor, a depth sensor, a pressure sensor, and a microphone.

16. The information processing apparatus according to claim 1, wherein the execution function is provided via at least one selected from a group comprising a projector, a display, a touch panel, a vibration device, and a speaker.

17. The information processing apparatus according to claim 1, wherein the circuitry is further configured to
initiate a storage, into a computer-readable medium upon which the second observation information is stored, of the first observation information in place of the second observation information.

18. The information processing apparatus according to claim 1, wherein the first observation information is acquired in real time.

19. An information processing method executed via a processor having circuitry, the method comprising:
obtaining, from sensors, first and second observation information related to at least one characteristic of a user;
recognizing the user based on correlation between the first and second observation information, wherein the correlation includes an amount of information of the first observation information which coincides with the second observation information;
determining, when the user is recognized, information of the first observation information that does not coincide with the second observation information as a change of the user; and initiating an execution function associated with the recognized user or the change of the user.

20. A non-transitory computer-readable medium having embodied thereon a program, which when executed by a computer causes the computer to execute a method, the method comprising:

obtaining, from sensors, first and second observation information related to at least one characteristic of a user;

recognizing the user based on correlation between the first and second observation information, wherein the correlation includes an amount of information of the first observation information which coincides with the second observation information;

determining, when the user is recognized, information of the first observation information that does not coincide with the second observation information as a change of the user; and initiating an execution function associated with the recognized user or the change of the user.

21. The information processing apparatus according to claim 1, wherein the user is recognized based on the amount of the first observation information which coincides with the second observation information exceeding a predetermined amount, and wherein only the information of the first observation information that does not coincide with the second observation information is determined as the change of the user.

* * * * *